United States Patent
Kearns

(10) Patent No.: US 12,292,912 B2
(45) Date of Patent: May 6, 2025

(54) METHOD AND SYSTEM FOR INTENT-BASED ACTION RECOMMENDATIONS AND/OR FULFILLMENT IN A MESSAGING PLATFORM

(71) Applicant: OrangeDot, Inc., Santa Monica, CA (US)

(72) Inventor: William Kearns, Santa Monica, CA (US)

(73) Assignee: OrangeDot, Inc., Santa Monica, CA (US)

( * ) Notice: Subject to any disclaimer, the term of this patent is extended or adjusted under 35 U.S.C. 154(b) by 0 days.

(21) Appl. No.: 18/961,148

(22) Filed: Nov. 26, 2024

(65) Prior Publication Data

US 2025/0094470 A1    Mar. 20, 2025

Related U.S. Application Data

(63) Continuation-in-part of application No. 18/520,987, filed on Nov. 28, 2023, which is a continuation of application No. 18/189,526, filed on Mar. 24, 2023, now Pat. No. 11,868,384, application No. 18/961,148, filed on Nov. 26, 2024 is a continuation-in-part of application No. 18/793,977, filed on Aug. 5, 2024, which is a continuation of
(Continued)

(51) Int. Cl.
G06F 16/338    (2019.01)

(52) U.S. Cl.
CPC ................. *G06F 16/338* (2019.01)

(58) Field of Classification Search
CPC ..................................................... G06F 16/338
See application file for complete search history.

(56) References Cited

U.S. PATENT DOCUMENTS

| | | |
|---|---|---|
| 4,845,323 A | 7/1989 | Beggs |
| 6,356,940 B1 | 3/2002 | Short |
| | (Continued) | |

FOREIGN PATENT DOCUMENTS

| | | |
|---|---|---|
| CN | 101600008 A | 12/2009 |
| JP | 2003339674 | 12/2003 |
| | (Continued) | |

OTHER PUBLICATIONS

Chaturvedi, Akhil , et al., "Method and System for Automatically Prioritized Content Provided to a User", U.S. Appl. No. 18/143,912, filed May 5, 2023.
(Continued)

*Primary Examiner* — Van H Oberly
(74) *Attorney, Agent, or Firm* — Jeffrey Schox

(57) ABSTRACT

A system for intent-based action recommendations and/or fulfillment in a messaging platform, preferably including and/or interfacing with: a set of user interfaces; a set of models; and/or a messaging platform. A method for intent-based action recommendations and/or fulfillment in a messaging platform, preferably including any or all of: receiving a set of information associated with a request; producing and sending a set of intent options; receiving a selected intent; generating a message based on the selected intent and/or the set of information; and providing the message.

19 Claims, 10 Drawing Sheets

Related U.S. Application Data application No. 18/143,912, filed on May 5, 2023, now Pat. No. 12,099,808.

(60) Provisional application No. 63/323,707, filed on Mar. 25, 2022, provisional application No. 63/409,933, filed on Sep. 26, 2022, provisional application No. 63/340,637, filed on May 11, 2022, provisional application No. 63/412,166, filed on Sep. 30, 2022, provisional application No. 63/602,836, filed on Nov. 27, 2023.

(56) References Cited

U.S. PATENT DOCUMENTS

| | | | |
|---|---|---|---|
| 6,827,670 | B1 | 12/2004 | Stark et al. |
| 7,188,151 | B2 | 3/2007 | Kumar et al. |
| 7,246,677 | B2 | 7/2007 | Fredriksson et al. |
| 7,248,677 | B2 | 7/2007 | Randall et al. |
| 7,337,158 | B2 | 2/2008 | Fratkina et al. |
| 7,376,700 | B1 | 5/2008 | Clark et al. |
| 7,584,166 | B2 | 9/2009 | Grichnik |
| 7,761,309 | B2 | 7/2010 | Sacco et al. |
| 7,818,185 | B2 | 10/2010 | Bjorner et al. |
| 8,160,901 | B2 | 4/2012 | Heywood et al. |
| 8,265,955 | B2 | 9/2012 | Michelson et al. |
| 8,398,538 | B2 | 3/2013 | Dothie et al. |
| 8,500,635 | B2 | 8/2013 | Zilca et al. |
| 8,684,922 | B2 | 4/2014 | Tran |
| 8,726,195 | B2 | 5/2014 | Bill |
| 9,129,227 | B1 | 9/2015 | Yee et al. |
| 9,286,442 | B2 | 3/2016 | Csoma et al. |
| 9,294,403 | B2 | 3/2016 | Mejia et al. |
| 9,684,922 | B2 | 6/2017 | Elberbaum |
| 10,741,285 | B2 | 8/2020 | Moturu et al. |
| 11,100,179 | B1 | 8/2021 | Zhou et al. |
| 11,386,890 | B1 | 7/2022 | Fan et al. |
| 11,409,752 | B1 | 8/2022 | Qadrud-Din et al. |
| 11,556,843 | B2 | 1/2023 | Backas et al. |
| 11,868,384 | B2 | 1/2024 | Shah et al. |
| 2002/0198473 | A1 | 12/2002 | Kumar et al. |
| 2003/0119794 | A1 | 6/2003 | Bacaner et al. |
| 2004/0078223 | A1 | 4/2004 | Sacco et al. |
| 2004/0225340 | A1 | 11/2004 | Evans |
| 2005/0020903 | A1 | 1/2005 | Krishnan et al. |
| 2005/0055321 | A1 | 3/2005 | Fratkina et al. |
| 2005/0108051 | A1 | 5/2005 | Weinstein |
| 2005/0169446 | A1 | 8/2005 | Randall et al. |
| 2006/0064037 | A1 | 3/2006 | Shalon et al. |
| 2007/0094048 | A1 | 4/2007 | Grichnik |
| 2007/0226012 | A1 | 9/2007 | Salgado et al. |
| 2007/0288266 | A1 | 12/2007 | Sysko et al. |
| 2008/0059570 | A1 | 3/2008 | Bill |
| 2009/0125333 | A1 | 5/2009 | Heywood et al. |
| 2010/0082367 | A1 | 4/2010 | Hains et al. |
| 2010/0179833 | A1 | 7/2010 | Roizen et al. |
| 2010/0203876 | A1 | 8/2010 | Krishnaswamy |
| 2010/0280838 | A1 | 11/2010 | Bosworth et al. |
| 2011/0009715 | A1 | 1/2011 | O et al. |
| 2011/0066036 | A1 | 3/2011 | Zilca et al. |
| 2011/0118555 | A1 | 5/2011 | Dhumne et al. |
| 2011/0119212 | A1 | 5/2011 | De et al. |
| 2011/0184250 | A1 | 7/2011 | Schmidt et al. |
| 2012/0053425 | A1 | 3/2012 | Michelson et al. |
| 2012/0143013 | A1 | 6/2012 | Davis et al. |
| 2012/0221357 | A1 | 8/2012 | Krause et al. |
| 2012/0289791 | A1 | 11/2012 | Jain et al. |
| 2013/0004129 | A1 | 1/2013 | Zhang |
| 2013/0041290 | A1 | 2/2013 | Kording et al. |
| 2013/0042116 | A1 | 2/2013 | Sakumoto |
| 2013/0085758 | A1 | 4/2013 | Csoma et al. |
| 2013/0095459 | A1 | 4/2013 | Tran |
| 2013/0117040 | A1 | 5/2013 | James et al. |
| 2013/0154838 | A1 | 6/2013 | Alameh et al. |
| 2013/0179178 | A1 | 7/2013 | Vemireddy et al. |
| 2013/0246330 | A1 | 9/2013 | Son et al. |
| 2013/0297536 | A1 | 11/2013 | Almosni et al. |
| 2014/0039914 | A1 | 2/2014 | Dansereau et al. |
| 2016/0019301 | A1 | 1/2016 | Goldenstein et al. |
| 2016/0317781 | A1 | 11/2016 | Proud |
| 2017/0099242 | A1 | 4/2017 | Gupta |
| 2017/0212916 | A1 | 7/2017 | Albert et al. |
| 2019/0349321 | A1 | 11/2019 | Cai et al. |
| 2020/0097814 | A1 | 3/2020 | Devesa |
| 2020/0151254 | A1 | 5/2020 | Wohlwend |
| 2020/0211709 | A1 | 7/2020 | Devesa |
| 2020/0285705 | A1 | 9/2020 | Zheng et al. |
| 2020/0356627 | A1 | 11/2020 | Pablo et al. |
| 2020/0372106 | A1 | 11/2020 | Liu et al. |
| 2021/0019648 | A1 | 1/2021 | Backas et al. |
| 2021/0117623 | A1 | 4/2021 | Aly et al. |
| 2021/0173874 | A1 | 6/2021 | Giddings et al. |
| 2021/0182328 | A1 | 6/2021 | Rollings et al. |
| 2022/0156298 | A1 | 5/2022 | Mahmoud et al. |
| 2022/0391591 | A1 | 12/2022 | Ronen et al. |
| 2023/0063131 | A1* | 3/2023 | Sengupta ............... G06N 3/006 |
| 2023/0096118 | A1 | 3/2023 | Ramsl |
| 2023/0135179 | A1* | 5/2023 | Mielke ................... G06N 5/022 704/232 |
| 2023/0141398 | A1 | 5/2023 | Bahdanau |
| 2023/0315999 | A1 | 10/2023 | Mohammed et al. |
| 2023/0316006 | A1* | 10/2023 | Tunstall-Pedoe .... G06N 3/0442 704/9 |
| 2023/0351118 | A1 | 11/2023 | Gelfenbeyn et al. |
| 2023/0367969 | A1 | 11/2023 | Chaturvedi et al. |

FOREIGN PATENT DOCUMENTS

| | | |
|---|---|---|
| JP | 2010514497 A | 5/2010 |
| WO | 2008085308 A1 | 7/2008 |
| WO | 2008096634 A1 | 8/2008 |
| WO | 2012025622 A2 | 3/2012 |
| WO | 2013042116 A1 | 3/2013 |
| WO | 2015003247 A1 | 1/2015 |

OTHER PUBLICATIONS

Major Smith, Virginia , et al., "Work Time Interference With Family, and Psychological Distress", 2002, Journal of Applied Psychology, vol. 87, No. 3, 427-436 (Year: 2002)., Feb. 21, 2018 00:00:00.0.

Thomee, Sara , et al., "Mobile phone use and stress, sleep disturbances, and symptoms of depression among young adults—a prospective short study", BMC Public Health, Biomed Central, London, GB, vol. 11, No. 1, Jan. 31, 2011, p. 66.

Yen, Cheng-Fang , et al., "Symptoms of problematic cellular phone use, functional impairment and its association with depression among adolescents in Southern Taiwan", Journal of Adolescence, Academic Press, Amsterdam, NL, vol. 32, No. 4, Aug. 1, 2009, pp. 863-873.

* cited by examiner

User (e.g., coach) interface

| | PHQ 🚩 SUICIDAL IDEATION | GAD |
|---|---|---|
| | ⚠ Severe (20/27) | ⚠ Moderate (10/21) |
| | Sep 12, 2021 1:54pm PST | Sep 12, 2021 1:54pm PST |

Summary  Scores  Details

∨ Tasks        Show completed ⊂⊙

My Follow-ups                          ∨

☐ Write a new talking point...

Initial Consult                        ∨

☐ Check All

☐ Greet
  Share availability, gather initial info

☐ Set the stage
  Explain consultation

☐ Review model of care
  Explain coaching/ therapy/ psychiatry

☐ Agreements
  Discuss how you'll work together

☐ Gather
  Build rapport, establish focus points

∨ Member Profile

Preferred Name
Drew Fullerton

Gender
Male, Non-Binary

Pronouns
He / Him

Race / Ethnicity
Asian American / Pacific Islander,
Black / African American

Date of Birth          Age
08/22/1989             32

Additional Demographic Info

Also uses they/them pronouns.
Both pronouns feel good, but he
feels slightly more comfortable
with he/him right now. His family is ∨ Member Background Values
Family, communication, honesty.

Self-care Strategies
Taking baths, journaling, talking to
friends, tennis, walking, and Member information

FIGURE 3B

METHOD AND SYSTEM FOR INTENT-BASED ACTION RECOMMENDATIONS AND/OR FULFILLMENT IN A MESSAGING PLATFORM

CROSS-REFERENCE TO RELATED APPLICATIONS

This application claims the benefit of U.S. Provisional Application Ser. No. 63/602,836, filed on 27 Nov. 2023, which is incorporated in its entirety by this reference.

This application is also a continuation-in-part of U.S. application Ser. No. 18/793,977, filed 5 Aug. 2023, which is a continuation of U.S. application Ser. No. 18/143,912, filed 5 May 2023, which claims the benefit of U.S. Provisional Application No. 63/340,637 filed 11 May 2022 and U.S. Provisional Application No. 63/412,166 filed 30 Sep. 2022, each of which is incorporated in its entirety by this reference.

This application is also a continuation-in-part of U.S. application Ser. No. 18/520,987, filed 28 Nov. 2023, which is a continuation of U.S. application Ser. No. 18/189,526 filed 24 Mar. 2023, which claims the benefit of U.S. Provisional Application No. 63/323,707 filed 25 Mar. 2022 and U.S. Provisional Application No. 63/409,933 filed 26 Sep. 2022, each of which is incorporated in its entirety by this reference.

TECHNICAL FIELD

This invention relates generally to the remote communication field, and more specifically to a new and useful system and method for intent-based action recommendations and/or fulfillment in a messaging platform in the remote communication field.

BRIEF DESCRIPTION OF THE FIGURES

FIGS. 3A-3B depict a first example of a user interface used in the system and/or method for intent-based action recommendations and/or fulfillment in a messaging platform.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1A:
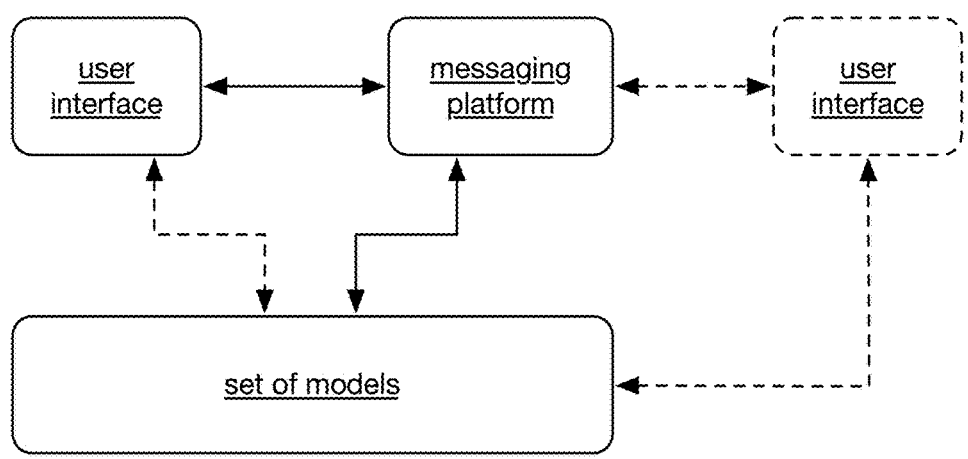
FIG. 1A is a schematic of a system for intent-based action recommendations and/or fulfillment in a messaging platform.

As shown in FIG. 1A, a system 100 for intent-based action recommendations and/or fulfillment in a messaging platform preferably includes and/or interfaces with: a set of user interfaces; a set of models; and/or a messaging platform. Additionally or alternatively, the system can include any or all of the components as described in U.S. application Ser. No. 18/189,526, filed 24 Mar. 2023, which is incorporated in its entirety by this reference.

Figure 2A:
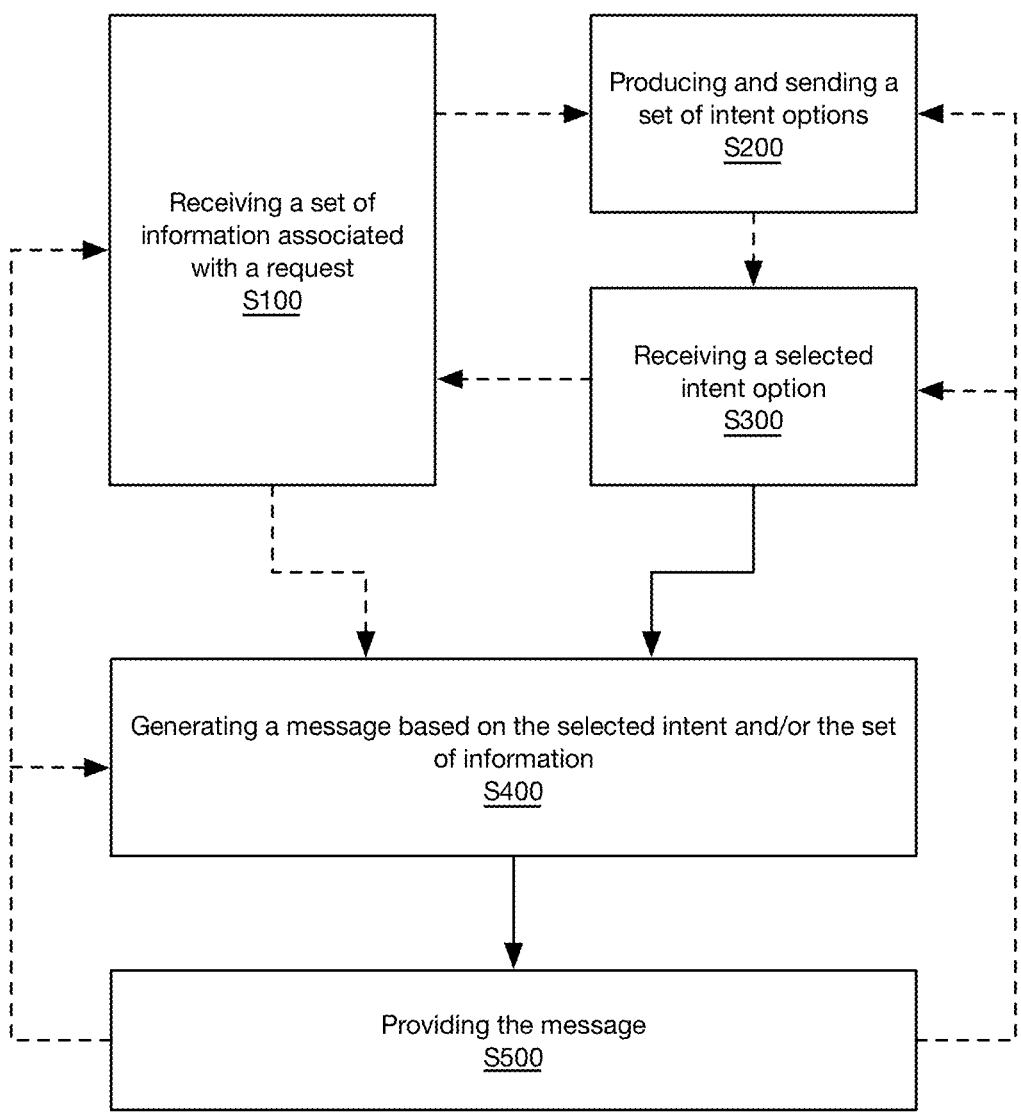
FIG. 2A is a schematic of a method for intent-based action recommendations and/or fulfillment in a messaging platform.
Figure 2B:
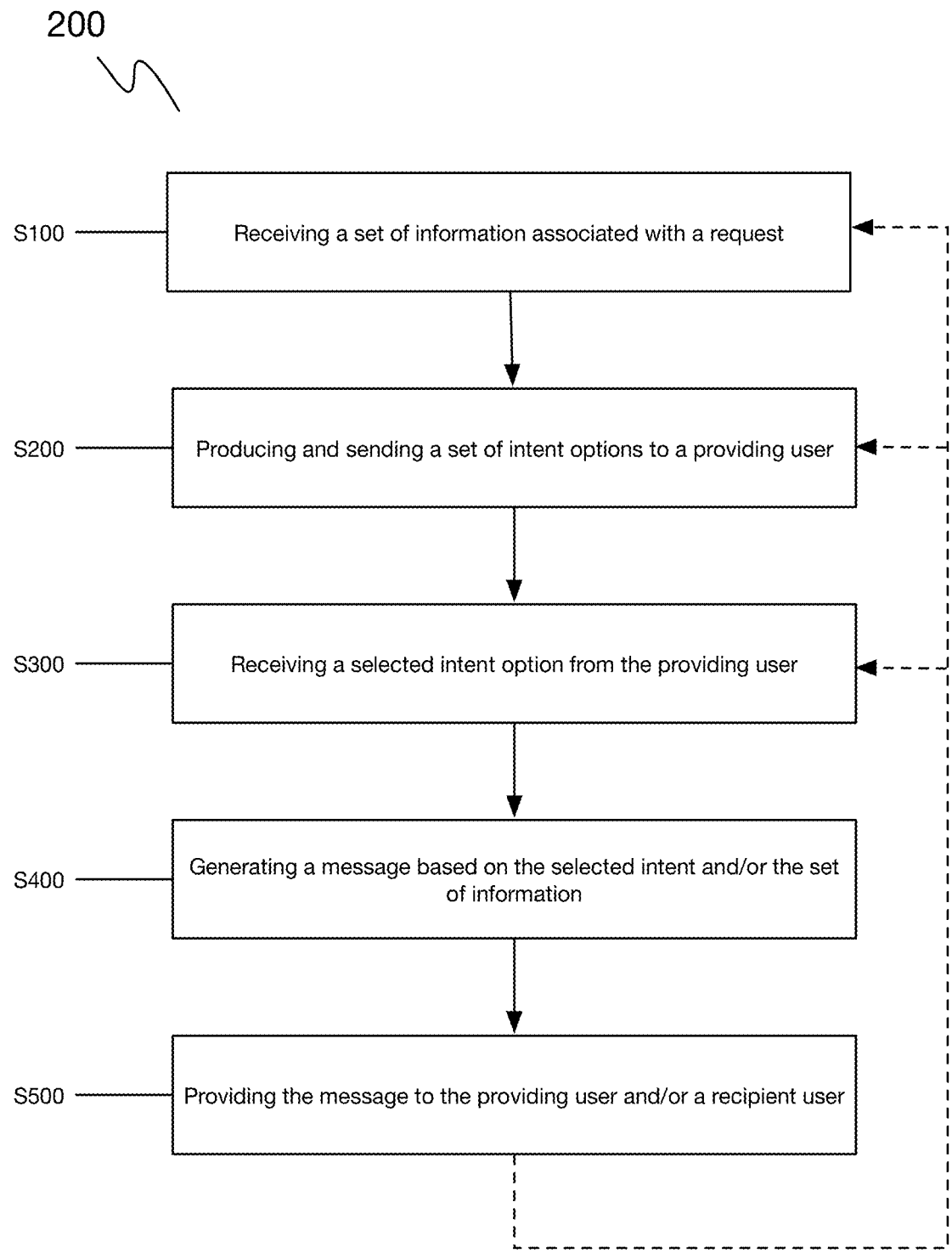
FIGS. 2B-2C are schematics of a first and second example, respectively, of the method.

As shown in FIG. 2A, a method 200 for intent-based action recommendations and/or fulfillment in a messaging platform can include any or all of: receiving a set of information associated with a request S100; producing and sending a set of intent options S200; receiving a selected intent S300; generating a message based on the selected intent and/or the set of information S400; and providing the message S500. In some examples (e.g., as shown in FIGS. 2B and/or 2C), the method can include any or all of: receiving a set of information associated with a request; producing and sending a set of intent options to a first user (e.g., providing user, receiving user, etc.); receiving a selected intent from the first user; generating a message based on the selected intent and/or the set of information; and providing the message to the first user and/or to a second user (e.g., receiving user, such as in examples in which the first user is a providing user). Additionally or alternatively, the method 200 can include any or all of the processes described in U.S. application Ser. No. 18/189,526, filed 24 Mar. 2023, which is incorporated in its entirety by this reference, or any other suitable processes performed in any suitable order. The method 200 can be performed with a system as described above and/or any other suitable system.

2. Technical Advantages

The system and method for intent-based action recommendations and/or fulfillment in a messaging platform (equivalently referred to herein as a communication platform) can confer several benefits over current systems and methods.

First, variants of the technology can improve the experience and/or output of coaches (and/or other users, such as other providing users) responsible for conversing with members of a communication platform. This can include, for instance, any or all of: increasing an efficiency and/or speed with a coach can respond in a messaging thread with a member (e.g., by reducing the burden associated with reading suggested responses, by reducing the latency of response generation by one or more models, etc.); increasing the number of members that the coach is able to handle; increasing the approval ratings and/or quality metrics of coaches due to faster response times and/or more targeted responses; providing more relevant responses to a member's message based on the intent of the coach and/or features of the member, and/or conferring any other improvements to digital health coaching and/or other messaging use cases. For example, this can improve member responses to treatment faster, more effectively, and/or with lower relapse rates.

In a set of examples, the system and/or method enable any or all of: reducing an amount of input required from the coach to create an accurate, suitable, and/or detailed response (e.g., coach only needs to provide an action/intent selection and the system produces a contextually-relevant response); scaling a coach's member base (e.g., while requiring the same total amount of time as previously);

preventing an overload of too much information to the coach (e.g., through the provision of intermediate short action labels rather than long message options); reducing a coach's reading time (e.g., only reads a single produced message based on the selected action label rather than multiple messages); and/or any other benefits can be conferred.

Additionally or alternatively, the technology can further improve the user experience by preventing coaches from providing redundant responses (e.g., which a member might perceive as an un-engaged coach)—such as through the auto-generation of unique messages—and/or the technology can otherwise improve the member experience.

Second, variants of the technology can utilize a combination of different message types and/or methods for producing messages to create an optimal experience for coaches in a variety of use cases. For instance, the system and/or method can be configured to automatically generate new messages (e.g., using artificial intelligence) along with retrieve old messages (e.g., previously sent by that coach, previously sent by another coach, etc.).

Third, variants of the technology can improve the functioning of a computer and/or are necessarily rooted in computer technology, such as, but not limited to, any or all of: increasing the speed with which messages (and/or message recommendations) can be provided to a user (e.g., by generating and/or providing messages in real time, near-real time, within a threshold time such as less than 10 ms, 15 ms, 20 ms, 50 ms, 100 ms, 200 ms, 500 ms, 1 s, 2 s, 5 s, 10-20 ms, 20-100 ms, 100-500 ms, 0.5-2 s, and/or greater than 2 s, etc.) while still configuring the messages to be beneficial and/or optimal for the conversation (e.g., based on multiple previous messages, based on dynamic changes occurring in the message thread, etc.); by helping interactions (e.g., between a human user and a non-human agent) remain focused, helpful, and/or aligned with the product's objectives, by reducing the risk of prompt injection, and/or by avoiding unexpected drift into unapproved topics, such as by utilizing an LLM prompt structure that includes controlled language (e.g., predetermined, templated, and/or otherwise controlled prompt segments), such as persona prompts and/or action prompts, that surround any potentially-uncontrolled (e.g., user-supplied) language (e.g., context information, such as conversation thread transcripts); and/or any other benefits.

Fourth, variants of the technology can improve (e.g., continuously, iteratively, etc.) the accuracy, usability, and/or output quality of any or all of a set of models utilized in the system and/or method, such as through a repeated retraining and/or updating of the models (e.g., each time the method is run, in a batched fashion, in response to a messaging session ending, at a set of intervals, etc.). In examples, for instance, determining whether or not a coach selected, sent, edited, and/or posted an automated response can be used as feedback to iteratively improve the messages produced by a model.

Additionally or alternatively, the system and method can confer any other benefits.

3. System

Figure 1B:
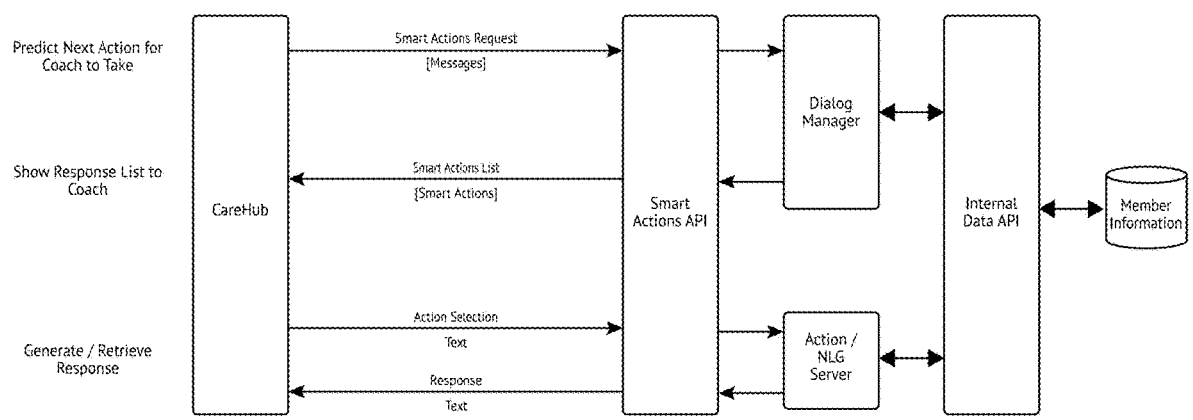
FIG. 1B is a schematic of an example of the system.

As shown in FIG. 1A, a system 100 for intent-based action recommendations and/or fulfillment in a messaging platform preferably includes and/or interfaces with: a set of user interfaces; a set of models; and/or a messaging platform. An example of the system is depicted in FIG. 1B. Additionally or alternatively, the system can include any or all of the components as described in U.S. application Ser. No. 18/189,526, filed 24 Mar. 2023, which is incorporated in its entirety by this reference.

The system 100 preferably functions to enable the efficient (e.g., automatic, partially automatic, with minimal input from a coach, etc.) provision of responses and/or response options to one or more users participating in a messaging thread. In some embodiments, the one or more users can include a coach, but can additionally or alternatively include a participant (e.g., care recipient) and/or any other user(s). As such, some embodiments of the system can function to decrease a mental load associated with composing and/or typing messages, enable the user providing the response to focus on more interesting and/or important parts of the conversation, and/or perform any other functions. Additionally or alternatively, the system 100 can function to prevent redundant response options from being provided to the user (e.g., by generating new messages each time, by tailoring the messages to the particular member and/or message thread context, etc.), reduce the time that it takes a user to provide a response, and/or can perform any other functions.

One or more instances of the system (e.g., response recommendation system instances) can be used for different: user classes, demographics, languages, pathologies, timeframes, and/or otherwise differ. Alternatively, the same system instance can be used for all users and respondents.

The system 100 preferably interfaces with a set of users, wherein in preferred variations, the set of users refers to both a care team and participants (equivalently referred to herein as members). However, users can refer to any other suitable entity. The care team (equivalently referred to herein as care providers) includes the individuals and/or entities (e.g., humans, non-human agents such as chat bots and/or other bots, etc.) involved in the coaching and/or care of the participant within a messaging platform (e.g., digital health platform, digital mental health platform, digital coaching platform, digital therapy platform, digital mentorship platform, etc.) and can include any or all of: coaches, supervisors (e.g., who supervise coaches, who supervise clinicians, etc.), clinicians (e.g., therapists, psychiatrists, psychologists, physicians, specialists, clinically-trained coaches, etc.), member support persons (e.g., who are involved in supporting the care team members and/or participants, technical support persons, etc.), non-human agents (e.g., chat bots, other bots, other agents, etc.), and/or any other individuals and/or entities. The set of participants (equivalently referred to herein as members and/or patients) preferably refers to individuals partaking in the platform (referred to herein as "receiving care") (e.g., receiving coaching, receiving clinical support, receiving advice, etc.), but can additionally or alternatively refer to any other suitable individuals.

The system 100 can optionally include and/or interface with a set of hubs (equivalently referred to herein as dashboards), wherein the set of hubs preferably functions as user interfaces for any or all of the users, wherein the user interface enables the user to provide and/or receive information (e.g., from other users, from a computing system, etc.). As such, the hubs can include any or all of: a messaging platform (e.g., with which users can exchange information), content (e.g., provided to a participant by his or her coach, provided to a participant automatically, etc.), a notes section (e.g., for a coach to record and/or share his or her observations of a participant, for a coach to communicate his or her observations to another coach and/or a supervisor and/or a clinician, etc.), a check-in section (e.g., to prompt a user to answer surveys, questionnaires, daily check-ins, etc.), and/or any other sections. In some preferred variants, for instance, the system includes a hub (referred to herein in some instances as a CareHub), which enables messages to be exchanged between users (e.g., between human users, such as between a care team user and a participant; between a human user, such as a participant, and a non-human agent, such as a chat bot).

The system can include (e.g., as defined by the hub) a set of user interfaces, wherein the user interfaces preferably include a set of front-end user interfaces. Each user (or any suitable subset thereof, such as each human user, each non-bot user, etc.) is preferably associated with a front-end user interface (e.g., executable on a user device and/or display associated with the user), such that the users can provide and receive messages, but can additionally or alternatively be associated with any number and/or types of interfaces.

In a first set of preferred variants, the front-end user interface of the care team users is configured to provide a set of intent (equivalently referred to herein as action) options, such that the user can select one of the intent options to produce a message associated with that intent. In a set of examples, for instance, the care team user's interface provides intent options in the form of short, action-oriented next steps for the message thread. With (based on) the selected intent, a message can be generated and/or provided (e.g., as described in the method 200 below) that is configured to achieve that intent. In a set of examples, for instance, when an intent option is selected (e.g., by a coach), a prompt is retrieved relevant to the desired action and sent to a generative AI subsystem (e.g., as described below), which returns a contextually relevant message configured to follow the instructions provided by the prompt. Additionally or alternatively, the member interfaces can optionally be associated with similar options and/or other options.

Additionally or alternatively (e.g., in a second set of preferred variants), the front-end user interface of the members can be configured to provide a set of intent (equivalently referred to herein as action) options, such that the user can select one of the intent options to enter a messaging mode associated with that intent (e.g., in which one or more messages associated with that intent are produced). In a set of examples, for instance, the member user's interface provides intent options in the form of short, action-oriented next steps (e.g., for interaction with a non-human agent of the care team, such as within a messaging thread or set of messaging threads). With (based on) the selected intent (preferably along with one or more messages, such as text-based messages, of a messaging thread), a message can be generated and/or provided (e.g., as described in the method 200 below) that is configured to achieve that intent. In a set of examples, for instance, after an intent option is selected (e.g., by a member), when a message is received (e.g., from the member), a prompt is retrieved relevant to the desired action and sent to a generative AI subsystem (e.g., as described below), which returns a contextually relevant message configured to follow the instructions provided by the prompt. Additionally or alternatively, the care team user interfaces can optionally be associated with similar options and/or other options.

Additionally or alternatively, the front-end user interface of the members can be configured to enable user entry of one or more text-based messages (e.g., in a messaging thread), such that the user can provide information to the system (e.g., about themselves; about their intent, desires, goals, feelings, state of mind, concerns, mood, etc.; about other information relevant to their care, such as relevant to coaching and/or therapy; etc.). In some examples, based on (e.g., in response to receipt of) one or more such messages and/or on a current system state (e.g., current chat bot mode), the system can determine (e.g., retrieve) one or more prompts (e.g., related to the message(s), the current system state, etc.) and provide the one or more prompts to a generative AI subsystem (e.g., as described below), which returns a contextually relevant message configured to be responsive to the user messages.

In one implementation, the systems and methods described take into account context to provide contextually relevant options to a user regarding which actions they can take next, in order to achieve a desired outcome. When the user selects one of these contextually relevant options, the system is able to complete the action on their behalf (e.g., with or without a human-in-the-loop).

The system preferably additionally includes and/or interfaces with a set of application programming interfaces (APIs), which function to pass information (e.g., requests) back-and-forth between one or more hubs and back-end services (e.g., where model processing is performed). In some variants, for instance, an internal data API is used to receive messages from a message thread and optionally use or determine information associated with the messages (e.g., context, metrics such as whether or not this is a member's $1^{st}$ coaching session, whether or not the member has experienced suicidal ideation and/or other conditions, what a user's goals with coaching are, etc.) to inform the intent labels (e.g., labels that are provided to the coach and/or member) and/or the resulting response (e.g., response provided to the coach and/or member). Additionally or alternatively, the system can include any other components or be otherwise suitably implemented.

The system preferably additionally includes a set or sets of models, which ultimately function to provide a response option to a user. The models preferably include trained models (e.g., machine learning models, deep learning models, neural networks, etc.), but can additionally or alternatively include rule-based models, a combination of trained and rule-based models, and/or any other models.

At least a portion of the set of models (equivalently referred to herein as the $1^{st}$ set of models) is preferably configured as a Dialog Manager, which functions to understand and enable guiding a conversation based on the context of the conversation (e.g., as described below). The Dialog Manager preferably includes one or more trained classifier models, which function to track a conversational state of a messaging thread and, based on this conversational state and/or other retrieved information (e.g., context), predict a set of most probable next actions for the care team user to take. Additionally or alternatively, the Dialog Manager can include models of a different architecture (e.g., trained regression models) and/or any other models.

The Dialog Manager preferably receives as input a set of messages, such as a query message or messages (e.g., which function to initiate the method 200; which function to initiate repetition of some or all elements of the method, such as repetition of S100, S400, and/or S500, optionally along with repetition of S200 and/or S300; etc.), a context (e.g., associated with the query, such as a set of previous messages in the current and/or prior conversational threads), and/or any other inputs. In some examples, for instance, Dialog Manager can also rely on information from one or more internal APIs, such as member profile information (e.g., member metrics, progress metrics, member condition metrics, etc.), a context for instigation of the session (scheduled, in-the-moment support, clinical, etc.), and/or any other information.

A query is preferably the last (a.k.a. the most recent) message in the conversation thread, but can alternatively be the last question in the thread, the last message from the other user, the last message from the member, the second to last message from the other user, the second to last message from the member, the last message from the responding user, and/or be any other suitable message. In a first set of preferred variants of the method 200 (e.g., as described below, such as in some variants in which the method is performed in association with a conversation thread between a human providing user and a recipient user), an instance of the method 200 is initiated each time a message is populated by any user in a conversation thread of the messaging platform or an event is received by the system. In a second set of preferred variants of the method 200 (e.g., as described below, such as in some variants in which the method is performed in association with a conversation thread between a recipient user and a non-human agent), an instance of the method 200 is initiated each time a message is populated by the recipient user in a conversation thread of the messaging platform (e.g., and is not initiated in response to a message being populated by the non-human agent).

The context preferably includes a set of messages (e.g., a set of context messages). The context can be from the conversation thread (e.g., subset of messages), be from past conversation threads (e.g., with the same set of interacting users, the same receiving user, the same responding user, etc.), and/or from any other suitable conversation thread. The context can include or exclude the query. The conversation thread can include a set of messages sent within a predetermined conversation window, a set of messages satisfying a set of conditions (e.g., sent within the conversation window, only messages sent by the receiving user, only messages sent by the responding user, etc.), and/or be otherwise defined. The conversation window can be defined by time, a number of messages, be dynamically determined (e.g., adjusted based on the sentiment, tone, etc. of the query, etc.), be defined based on the context of an intent selection (e.g., for a conversation thread between a recipient user and a non-human agent, selecting only messages sent within the context of a single intent selection, such as selecting all messages sent after the most recent intent selection was received), and/or otherwise defined. The conversation window can be defined relative to: the query, the to-be-determined response, the message preceding the query, a predetermined number of messages preceding the query, the last message sent by the responding user, the last message sent by the other user, the current time (e.g., wall clock time), the query time, a time for any of the aforementioned messages, and/or relative to any other suitable reference. The conversation window can be a window: immediately preceding the query, immediately preceding and including the query; multiple windows (e.g., first predefined number of messages in the conversation and most recent predefined number of messages in the conversation; first predefined number of seconds of the conversation and most recent predefined number of seconds of the conversation; etc.); and/or any other window within the conversation. In examples, the conversation window can include: all prior messages sent in the conversation; a set number of messages sent in the conversation (e.g., 3 messages, 4 messages, etc.); all messages sent within a specific time window (e.g., last minute, last 5 minutes, last 10 minutes, etc.); a random subset of messages; and/or other intervals of messages. The context can additionally or alternatively include a set of retrieved information, such as personalization information (e.g., names, gratitude lists, member goals, member mood, member quiz entries and/or results, etc.). However, the context can be otherwise defined.

The Dialog Manager preferably produces as an output a set of multiple action options (action labels), which are provided at a user interface (e.g., coach user interface; member user interface, such as for conversations between a member and a non-human agent; etc.), where the user can select one of the action options.

In a first set of variants (e.g., as shown in FIGS. 2B and/or 3A), user (e.g., coach) selection of an action option can trigger the retrieval and/or generation of a response configured to achieve the selected action. Optionally, the selection of an action option can be utilized in training (e.g., retraining, updating, etc.) any or all of the set of models (e.g., to improve accuracy of the models, to improve a predictive power of how to best guide the conversation, to improve satisfaction of users in the provided responses, etc.). In examples, for instance, information regarding any or all of the following can be utilized in retraining the Dialog Manager and/or the generative model described below: a likelihood that a particular action is selected by the user (e.g., relative to other actions); a frequency with which a generated response is used by the user in response to selecting the associated action (e.g., indicating the success of the generated response in achieving the action); a frequency with which a generated response is not used by the user in response to selecting the associated action (e.g., indicating the failure of the generated response in achieving the action); a success of the action and/or resulting response in guiding the conversation (e.g., as measured by future messages in the conversation thread, as measured by progress and/or satisfaction metrics associated with the member, as measured by a coach quality metric associated with the coach providing the response(s), etc.); edits made to the generated response (e.g., before posting the edited response to the conversation thread) and/or the resulting edited responses (e.g., wherein the edited responses, preferably along with the selected action option and/or the context, can be used as training examples); and/or any other information.

In some variants, the action options include a set of intents and/or objectives to be achieved from the associated response. The intent options can be selected by the Dialog Manager from a predetermined list. In examples, the intent options are selected by the Dialog Manager from a predetermined list including hundreds of different actions, where the actions of the predetermined list could have been any or all of: manually generated, automatically proposed (e.g., from a separate generative model), retrieved from previous coaching sessions, and/or otherwise created. In alternative examples, the Dialog Manager can generate new action options (e.g., Dialog Manager including one or more generative models).

The action options can be of a particular type and/or classification, where the type and/or classification can function to inform how a response is produced and/or how any or all processes of the method 200 are performed.

In some variants, for instance, action types can include: generative actions, retrieval actions, and system-level actions. Alternatively, the actions can be of other types.

In a first of these variants, system-level actions provide options for the user to perform and/or initiate a task based on the conversation thread and associated with his or her user interface, such as: recording a note from the session (equivalently referred to herein as the conversation thread), retrieving a list of content recommendations (e.g., articles, files, etc.) to send to the member, flagging a message and/or bringing in another user to the messaging platform (e.g., clinical care user), and/or any other actions. In a particular specific example, the system-level actions are in the form of robotic process automations (RPAs) that automate the otherwise manual sequence of interactions a care provider would need to take within the CareHub. For instance, an "Add to Notes" action can be selected to append information extracted from the last message to a notes tab within the CareHub. Any or all of the system-level actions can be: persistently provided as options to the user, provided if selected by the Dialog Manager, and/or provided in any combination of ways.

In the first or alternative variants, the retrieval actions enable previous and/or predetermined responses (e.g., from the coach, from a different user, from a corpus of messages, for all coaches on the platform, etc.) to be provided (e.g., recommended) to the user (e.g., as retrieved from a lookup table, based on a 1:1 mapping between the action and the retrieved response, etc.). These retrieved responses can be any or all of: editable and/or customizable, able to be stored (e.g., for future use), and/or otherwise used. In a particular specific example, an action prescribing "Share Coaching Agreement" can be selected and initiate the retrieval of a predetermined message that describes boundaries for the relationship between the coach and user, which can be re-used in all member onboarding (e.g., as editable by each specific coach). In some examples, retrieval actions can be performed such as described in U.S. patent application Ser. No. 18/520,987, filed 28 Nov. 2023 and titled "METHOD AND SYSTEM FOR AUTOMATICALLY DETERMINING RESPONSES IN A MESSAGING PLATFORM", which is herein incorporated in its entirety by this reference.

In the first or alternative variants, the generative actions trigger contextually-relevant responses to be created (equivalently referred to herein as generated) with a second model and/or set of models (e.g., as described below). In examples, such generative actions can include any or all of: task assignment actions (e.g., assign a survey, such as a mood check-in survey, to the member), explanation actions (e.g., explain coaching process, explain coaching approach being employed, etc.), pleasantry actions (e.g., greet member, express thanks, etc.), praise actions (e.g., praise member for having a good insight, for putting in effort, for meeting goals, etc.), scheduling actions (e.g., schedule next session, reschedule upcoming session, etc.), information request actions (e.g., request member demographic info), transfer actions (e.g., inform member that the conversation will be transferred to member support, to another coach, etc.), interview actions (e.g., guide member to identify important information, such as identifying goals, identifying actionable steps for change, etc.), and/or any other suitable categories actions.

Figure 2C:
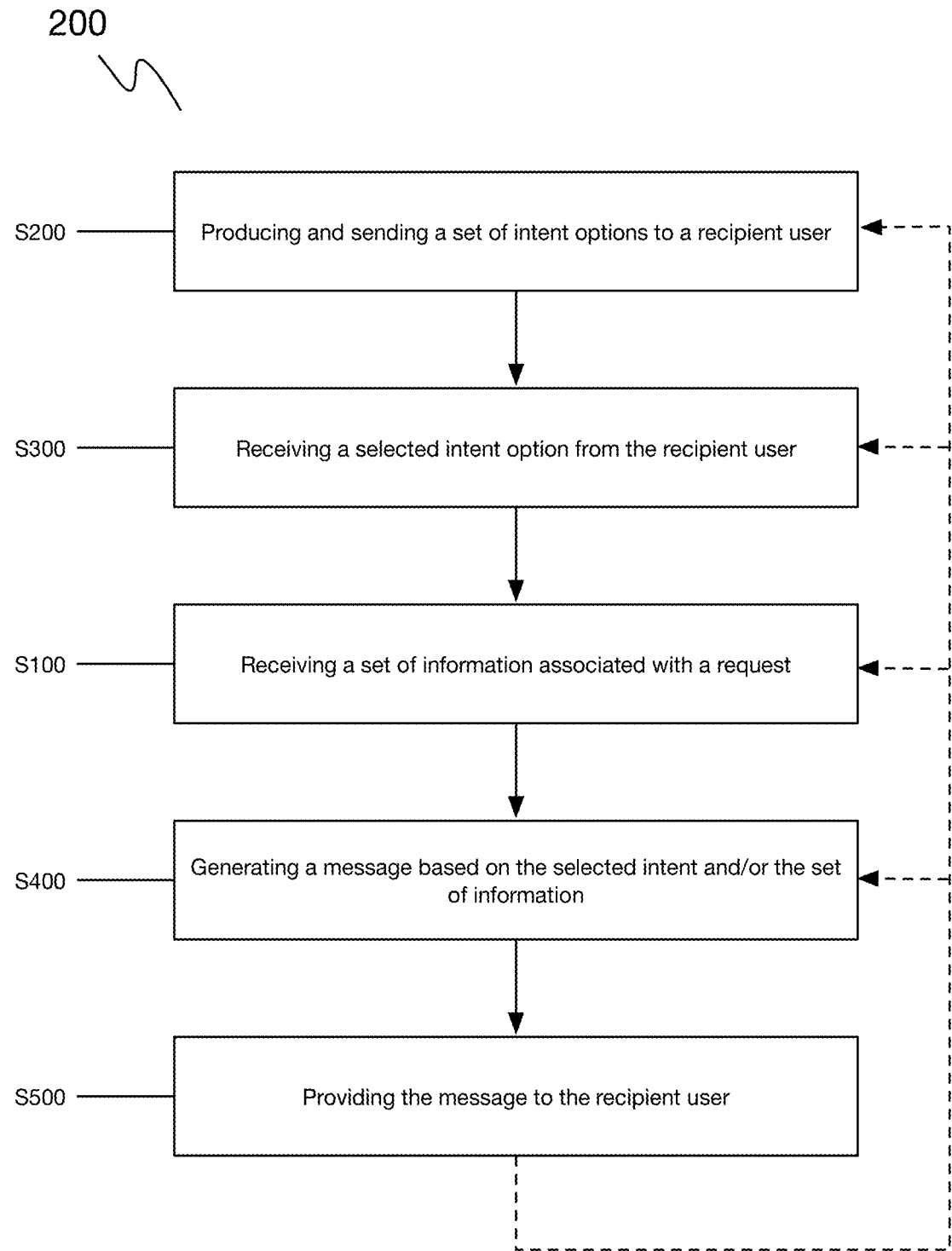
Figure 4A:
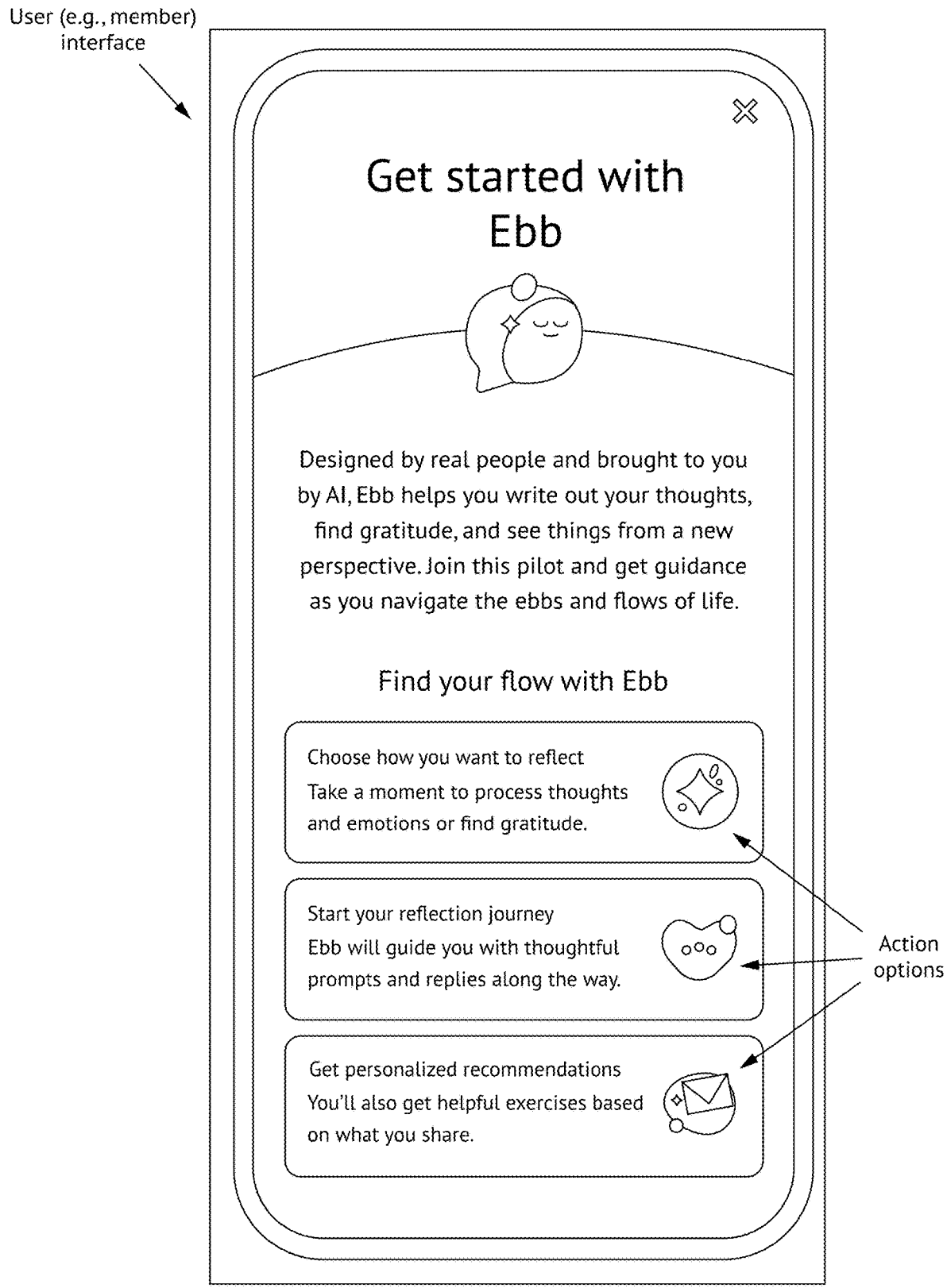
FIGS. 4A-4C depict a second example of a user interface used in the system and/or method for intent-based action recommendations and/or fulfillment in a messaging platform.
Figure 4B:
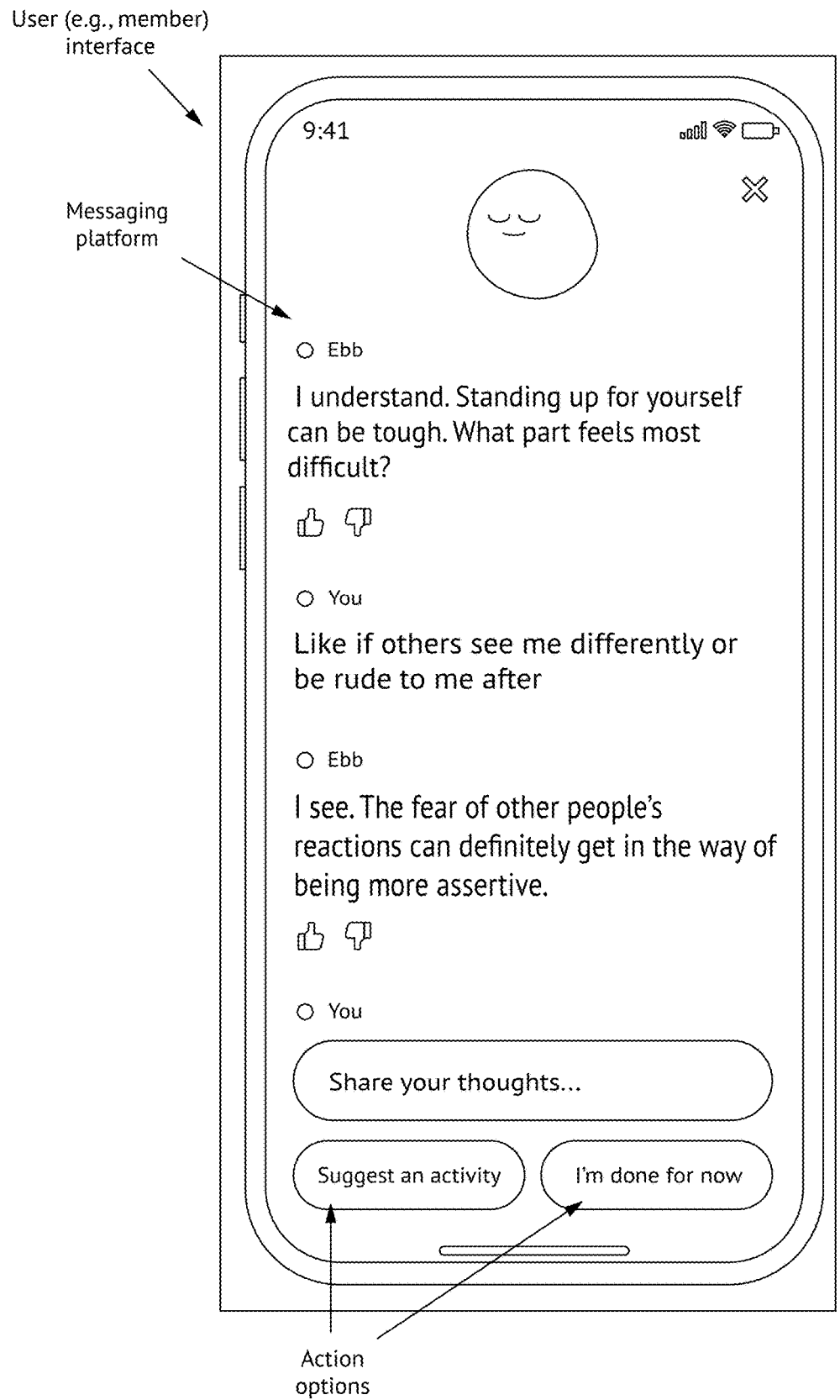
Figure 4C:
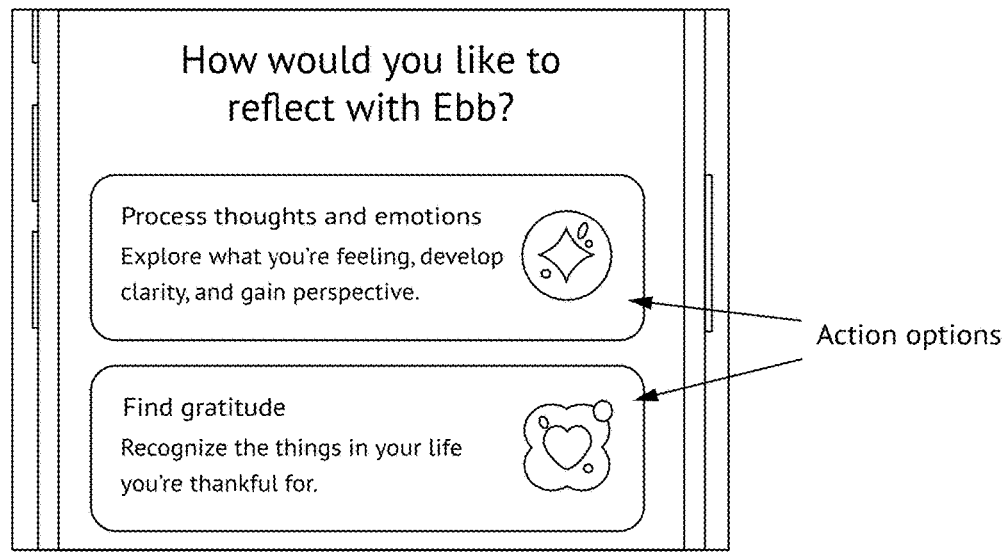
Figure 4C:
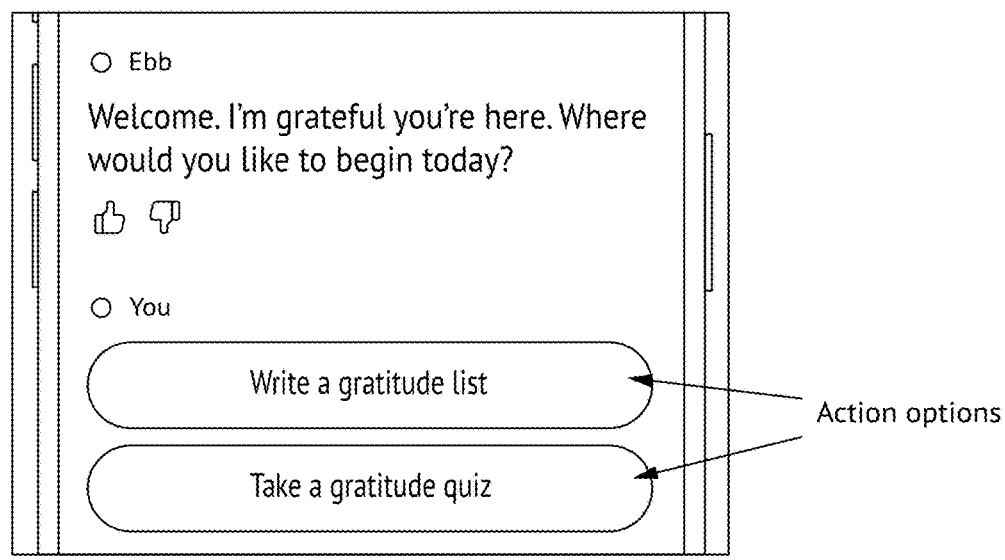

In a second set of variants (e.g., as shown in FIGS. 2C, 4A, 4B, and/or 4C), additional or alternative to the first set of variants, user (e.g., member) selection of an action option can trigger the beginning (and/or continuation) of a conversation thread (e.g., between the user and a non-human agent) and/or conversation mode (e.g., informing the non-human agent's responses, such as wherein one or more such responses are generated based on the selected action) within a conversation thread to achieve the selected action. Optionally, the selection of an action option can be utilized in training (e.g., retraining, updating, etc.) any or all of the set of models (e.g., to improve accuracy of the models, to improve a predictive power of actions to suggest, to improve satisfaction of users in the provided responses, etc.). In examples, for instance, information regarding any or all of the following can be utilized in retraining the Dialog Manager and/or the generative model described below: a likelihood that a particular action is selected by the user (e.g., relative to other actions); a success of the action and/or resulting response(s) in guiding the conversation (e.g., as measured by future messages in the conversation thread, as measured by progress and/or satisfaction metrics associated with the member, etc.); and/or any other information.

In some variants, the action options include a set of intents and/or objectives to be achieved in the subsequent conversation. The intent options can be static, can be selected by the Dialog Manager from a predetermined list, and/or can be determined in any other suitable manner. In examples, the intent options are selected by the Dialog Manager from a predetermined list (e.g., including 1-3, 3-10, 10-20, 20-50, 50-100, or more than 100 different actions, etc.), where the actions of the predetermined list could have been any or all of: manually generated, automatically proposed (e.g., from a separate model, such as a separate generative model), retrieved from previous sessions such as previous coaching sessions, and/or otherwise created. In alternative examples, the Dialog Manager can generate new action options (e.g., for a Dialog Manager including one or more generative models).

The intent options (e.g., intent options presented, intent options from which the Dialog Manager chooses, etc.) can include any or all of: summarization actions, content recommendation actions, member task actions, and/or any other suitable actions. In examples, summarization actions can include any or all of: summarizing the current conversation; summarizing one or more past conversations, such as member's most recent conversation(s) with a coach; summarizing the results of one or more user activities (e.g., quiz results, gratitude lists, etc.), and/or summarizing any other suitable information associated with the member. In examples, content recommendation actions can include any or all of: recommending one or more content modules based on information already gathered (e.g., based on the current conversation, based on past conversations, etc.), gathering information (e.g., initiating a conversation or conversation mode, providing a content recommendation quiz to the member, etc.) to determine one or more content modules to recommend (e.g., and offering one or more such content modules as recommendations), and/or recommending content based on any other suitable information; in some such examples, content recommendations can be determined such as described in U.S. patent application Ser. No. 18/793,977, filed 5 Aug. 2024 and titled "METHOD AND SYSTEM FOR AUTOMATICALLY PRIORITIZING CONTENT PROVIDED TO A USER", which is herein incorporated in its entirety by this reference (e.g., wherein the system and/or method described herein can optionally include any suitable elements of the systems and/or methods described in U.S. patent application Ser. No. 18/793,977). In examples, member task actions can include any or all of: gratitude tasks (e.g., writing a gratitude list, taking a gratitude quiz, etc.), tasks for exploring thoughts and/or feelings (e.g., initiating a reflection conversation, such as with a non-human agent), journaling tasks (e.g., starting a wellbeing journal, such as guided by a non-human agent), and/or any other suitable tasks that can be undertaken by the member.

In some examples (e.g., for particular intent options, for all intent options, etc.), selection of an intent option (e.g., by a member) can result in initiation of a conversation (e.g., between the selector, such as the member, and a non-human agent, such as a chat bot) and/or initiation of a new conversation mode (e.g., configuration for the non-human agent) within a conversation. In some examples, the selected intent can be used as an input variable to one or more trained models (e.g., classifier models and/or regression models); used for selection of one or more prompts (or one or more portions of one or more prompts) to provide to one or more trained models, such as language models (e.g., LLMs); and/or used in any other suitable manner.

Figure 5:
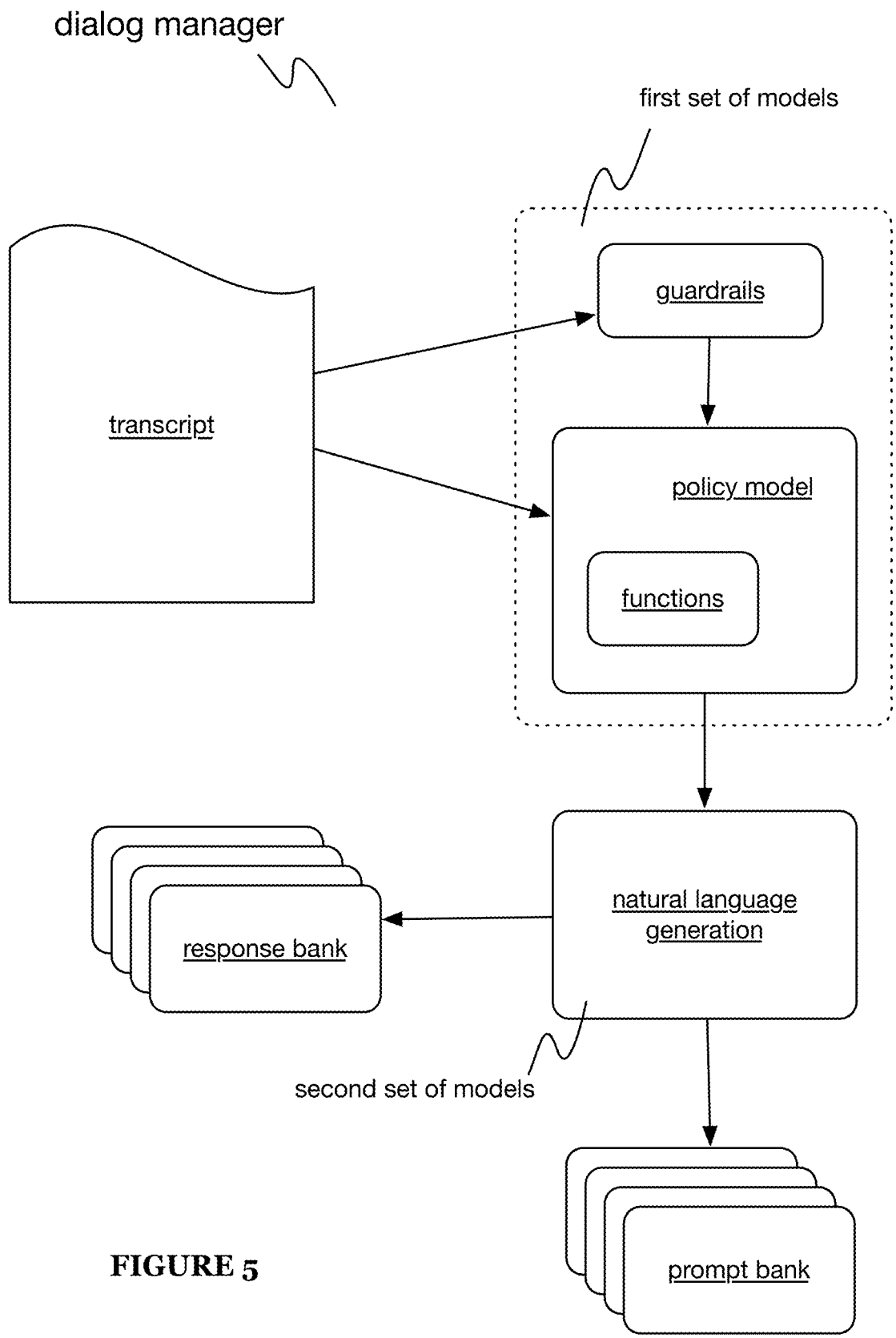
FIG. 5 is a schematic of an example of a dialog manager of the system.

In this second set of preferred variants (e.g., associated with one or more conversation threads between a user and a non-human agent), the Dialog Manager preferably handles each conversation (or conversation mode) in an iterative manner, such as determining one or more actions to take before waiting for a user's response, and then repeating this iterative process based on the user's response. In one such variant, the Dialog Manager includes a set of one or more guardrail models and/or a policy model, such as shown by way of example in FIG. 5.

The set of guardrail models can function to detect potentially harmful and/or high-risk conversations (e.g., conversations that may require and/or benefit from professional intervention, such as from a therapist or mental health professional). In response to detecting such a conversation, the Dialog Manager can do any or all of: encouraging the user to seek professional intervention (e.g., to seek a consultation with a therapist or mental health professional), provide the user with an option to schedule a therapy session, add a note (e.g., visible to the care team) associated with the user and indicative of the detection, contact one or more entities of the user's care team with information indicative of the detection, redirect the conversation, terminate the conversation, and/or take any other suitable action (s). In one example, the set of guardrail models includes a first stage model and a second stage model. The first stage model can be a low-latency model (e.g., classification model, such as a trained classification model) that functions to evaluate all messages provided by the user during the conversation, wherein any messages (or sets of messages) that are classified as possibly harmful and/or high-risk are preferably passed to the second stage model for further evaluation (whereas messages that are not so classified can bypass the second stage model and proceed to handling by the policy model, such as by being provided to the policy model and/or by allowing the policy model to proceed with processing the message). The second stage model can be a more comprehensive model than the first stage model (e.g., higher-latency model, LLM-based model, etc.), which can function to assess and/or validate the classification of the first stage model (e.g., wherein messages determined by the second stage model not to be potentially harmful and/or high-risk can proceed to handling by the policy model, whereas messages determined by the second stage model to be potentially harmful and/or high-risk can be handled such as described above), to determine appropriate next steps for handling and/or responding to the message, and/or can function in any other suitable manner. However, the Dialog Manager can additionally or alternatively include any other suitable guardrail models (or can alternatively include no such models).

The policy model preferably functions to iteratively select and perform a sequence of steps (e.g., within the context of the conversation). The steps are preferably selected based on policy model predictions (e.g., prediction of which step(s) would be most appropriate to employ, given the current conversation mode, selected intent, and/or context of the conversation). In some variants, these steps can include: message steps, system-level steps, wait steps, and/or any other suitable step types.

The system-level steps can be operable to receive, retrieve, and/or validate information (e.g., via a set of one or more functions). In examples, performing a system-level step can include one or more of: retrieving content recommendations (e.g., as described in U.S. patent application Ser. No. 18/793,977, filed 5 Aug. 2024 and titled "METHOD AND SYSTEM FOR AUTOMATICALLY PRIORITIZING CONTENT PROVIDED TO A USER", which is herein incorporated in its entirety by this reference); extracting information provided by one or more users (e.g., by the member engaged in the present conversation thread, information associated with the member and provided by one or more care team users, etc.), such as personalization information (e.g., names, gratitude lists, member goals, member mood, member quiz entries and/or results, etc.); maintaining context across the present conversation and/or with prior conversations (e.g., via slot carryover); verifying information for accuracy; and/or performing any other suitable system-level tasks. In examples, the information obtained via system-level steps can be used: to modify message text (e.g., personalize the message text, such as adding the member's name), to modify generative model prompts (e.g., include information about the member, such as member name, goals, gratitude list items, mood, preferred language, etc.), and/or used in any other suitable manner.

The message steps are preferably operable to post one or more messages to the conversation. In some examples, the message steps can include retrieval steps, generative steps, and/or any other suitable message steps. Retrieval steps preferably enable previous and/or predetermined responses (e.g., from the non-human agent, from other care team users, from a corpus of messages, etc.) to be retrieved (e.g., from a lookup table, such as based on a 1:1 mapping between the retrieval step and the retrieved response, etc.) for use in the conversation (e.g., posted to the conversation thread); in some such examples, this can be performed such as described in U.S. patent application Ser. No. 18/520,987, filed 28 Nov. 2023 and titled "METHOD AND SYSTEM FOR AUTOMATICALLY DETERMINING RESPONSES IN A MESSAGING PLATFORM", which is herein incorporated in its entirety by this reference. The retrieved messages can be used as retrieved, used after modification (e.g., modification based on information obtained via one or more system-level steps, such as adding a member's name, goals, gratitude list items, etc.), and/or used in any other suitable form. Generative steps preferably trigger contextually-relevant responses to be created (equivalently referred to herein as generated) with a second model and/or set of models (e.g., as described below). In some examples, message steps can be handled such as described regarding retrieval and/or generative actions (e.g., in the context of a conversation between a member and a coach), such as wherein the policy model acts in a manner analogous to a coach selecting one or more intents; for example, some or all retrieval steps can include retrieving one or more messages in a manner analogous to the retrieval actions described above, and/or some or all generative steps can include generating one or more messages in a manner analogous to the generative actions described above (e.g., using one or more prompts and/or prompt portions such as described regarding such generative actions). However, the message steps can additionally or alternatively include determining and/or posting any suitable messages in any suitable manner.

The wait steps are preferably operable to halt the policy model's iterative determination and/or performance of steps to await further input (e.g., input from the member associated with the conversation thread, such as input from the member within the conversation thread). Once such input is received, the wait step can be considered complete.

The policy model preferably selects and performs one or more such steps in each turn (e.g., wherein a turn is performed in response to a message posted to the conversation thread by the member). For example, in each turn, the policy model can select and perform: zero or more system-level steps, zero or more response steps (preferably one or more response steps), and a single wait step. In this example, in a single turn, the policy model can optionally select and perform system-level steps (e.g., to select, inform, modify and/or provide a basis for one or more response steps), preferably performs at least one response step (e.g., posting the results to the conversation thread, such as by posting the result of each response step as a separate message in the thread; by combining the results of multiple response steps, such as all response steps performed in the turn or any suitable subset thereof, into a single message that is posted to the thread; by posting the results, or any suitable subset thereof, in any other suitable manner; etc.), and then performs a wait step. However, the turns can additionally or alternatively be performed in any other suitable manner.

Each message posted to the conversation thread by the member (or each set of consecutive messages satisfying a particular criterion, such as the set of all such messages posted consecutively by the member within a threshold period of time, such as 1 s, 2 s, 5 s, 10 s, 30 s, etc.) preferably prompts the policy model to perform a turn. However, a turn can additionally or alternatively be performed for only a subset of such messages (or sets of messages) and/or in response to satisfaction of any other suitable criteria.

However, the policy model can additionally or alternatively have any other suitable elements, architecture, and/or functionalities.

Additionally or alternatively, any other actions and/or action types can be utilized for any suitable purpose.

The system preferably additionally includes a $2^{nd}$ set of models, equivalently and/or collectively referred to herein as an action server (e.g., Natural Language Generation (NLG) server), which preferably function to handle some or all actions, such as system actions, retrieval actions, and/or generative actions (e.g., generating new, custom responses for a user, such as a coach or other providing user; for a non-human agent, such as a bot participating in a conversation thread with a user, such as a recipient user; etc.).

In a first set of variants (e.g., associated with a conversation thread between a providing user and a recipient user), the generated response is preferably produced in response to a generative action option being selected by the same user, but can additionally or alternatively be produced in response to another trigger and/or in absence of a trigger. In alternative variants, for instance, an intent of a conversation thread can be assessed with artificial intelligence (e.g., absent of the user being providing and/or selecting an intent), where this intent is used to automatically generate a response.

In a second set of variants (e.g., associated with a conversation thread between a recipient user and a non-human agent), the generated response is preferably produced in response to a generative step being selected by the policy model (e.g., as described above in more detail), but can additionally or alternatively be produced in response to another trigger and/or in absence of a trigger.

The $2^{nd}$ set of models preferably includes a Natural Language Processing (NLP) model, more preferably including one or more Large Language Models (LLMs) (e.g., to generate a contextually-relevant, novel response). The LLMs can include one or more foundation models, such as GPT (e.g., GPT-4o, -4 Turbo, -4, -3.5 Turbo, etc.), Claude, Mistral, LLAMA, and the like, and/or any other suitable LLMs. In some examples, the LLM (e.g., foundation model) can be prompt-tuned, fine-tuned, and/or otherwise trained for use in (e.g., as) the $2^{nd}$ set of models. In some examples, some or all such models (e.g., the foundation model, the prompt-tuned and/or fine-tuned model, etc.) can be trained for use in more than one human language (e.g., trained using training data including examples in multiple languages); for example, some or all such models can be trained using multi-language approaches such as described in U.S. patent application Ser. No. 18/520,987, filed 28 Nov. 2023 and titled "METHOD AND SYSTEM FOR AUTOMATICALLY DETERMINING RESPONSES IN A MESSAGING PLATFORM", and/or in U.S. patent application Ser. No. 18/793,977, filed 5 Aug. 2024 and titled "METHOD AND SYSTEM FOR AUTOMATICALLY PRIORITIZING CONTENT PROVIDED TO A USER", each of which is herein incorporated in its entirety by this reference. However, the $2^{nd}$ set of models can additionally or alternatively include any other suitable generative models and/or any other suitable models of any kind(s).

The $2^{nd}$ set of models preferably receives as input at least a context of the conversation thread (e.g., including the most recent messages in the current conversation thread, which preferably includes messages posted by all parties to the conversation thread, such as including a threshold number of messages, all messages received within a threshold period of time, and/or any other suitable amount of conversation history) and/or any other conversation threads (e.g., as described above), and further preferably a query (a.k.a. last message in the thread), but can additionally or alternatively receive additional member information (e.g., member goals such that the intent can further reflect member goals, as shown in FIG. 3B, etc.), coach information (e.g., a coach writing style, such as to enable emulation of the coach's writing style, such as the writing style exhibited by the coach's previous messages), session context (e.g., scheduled coaching session, in-the-moment coaching support, clinical therapy session, etc.), and/or any other information. In some examples, for instance, the LLM can produce a novel response that further tailors the response to the writing style of a coach (e.g., who would then send that response to a member, who would be mimicked by a non-human agent participating in a conversation thread with a member, etc.). In other examples, the LLM can tailor the response to not only achieve an intent (e.g., based on the selected intent option, such as selected by the coach or by the member) but also align with one or more goals of the recipient user (e.g., member).

Further, the $2^{nd}$ set of models preferably receives instructions indicative of a persona (e.g., role for an LLM to impersonate, such as "behavioral health coach"; language in which the response should be generated, such as English or Spanish; etc.) (referred to herein as a "persona instruction", "persona prompt", and/or "persona portion") and/or indicative of the desired intent/action to be achieved by the response (e.g., associated with and/or indicative of the intent selected by the user, an intent selected by the policy model, etc.) (referred to herein as an "action instruction", "action prompt", and/or "action portion"). The persona instruction and/or action instruction are preferably predetermined instructions (e.g., retrieved from a database) and/or modified (e.g., personalized) versions of predetermined instructions, but can additionally or alternatively be created generatively (e.g., by a generative model of the $1^{st}$ set of models) and/or in any other suitable manner. In examples, the persona instructions can include any or all of: "You are a behavioral health coach.", "You are a Spanish-speaking behavioral health coach.", "You are a behavioral health coach with a gentle, down-to-earth writing style", "You are a behavioral health coach with a writing style similar to the following writing sample" followed by a writing sample of a coach to emulate, and the like. The persona instructions are preferably unchanged (or substantially unchanged) throughout the course of an entire conversation thread, but can alternatively differ (e.g., between different selected intents, different turns, different generative actions within a turn, etc.). The action instructions can include examples such as described above (e.g., regarding the $1^{st}$ set of models) and/or any other suitable instructions. The action instructions preferably differ between different selected intents (e.g., and may differ within a single selected intent, such as between different turns, different generative actions within a turn, etc.), but can alternatively be constant (e.g., throughout the course of an entire conversation thread).

In some examples, a prompt provided to an LLM of the $2^{nd}$ set of models can include: a persona portion, a context portion (e.g., conversation history, such as described above), and an action portion. In a specific example, the context portion is preceded by a first non-context portion (e.g., persona portion) and followed by a second non-context portion (e.g., action portion), which can function to help the generated responses to remain focused, helpful, and/or aligned with objectives for the platform and/or the non-human agent (e.g., by reducing the risk of prompt injection, by reducing unexpected/undesired drift into unapproved topics, etc.).

In a first demonstrative example (e.g., in which a member is engaged in a conversation thread with a coach), the coach is provided with and selects an intent that prescribes "Reflective Listening," which is used by the LLM, along with a context of the conversation thread and/or a query (e.g., last message), to generate a novel response that the coach can provide to the user, where the response aims (e.g., is configured) to communicate that the coach is listening to the member in a reflective style (e.g., by repeating back portions of the last message from the member, by using certain words, by using text or text strings having a certain semantic meaning, etc.).

In a second demonstrative example (e.g., in which a member is engaged in a conversation thread with a non-human agent), the member is provided with and selects an intent that prescribes "Summarizing the Session". In this example, in response to selection of this intent, the policy model selects a generative step, and so it determines a prompt indicative of the selected intent and provides the prompt, along a context of the conversation thread, to the LLM. In response to receipt of the prompt, the LLM generates a novel response that aims (e.g., is configured) to communicate a summary of the conversation thread, and provides this response to the policy manager. The policy model then provides this response to the member and selects one or more other steps, including a wait step to end the policy model turn.

In a third demonstrative example (e.g., in which a member is engaged in a conversation thread with a non-human agent), the member is provided with and selects an intent that prescribes "Reflective Listening". In this example, in response to selection of this intent, the policy model enters a "reflective listening" conversation mode (e.g., initiates a conversation thread in this mode, continues a previous conversation thread and shifts into this mode, etc.), performing one or more turns such as described above regarding the policy model (e.g., wherein the first turn includes a retrieval step associated with entering the reflective listening mode, wherein some or all subsequent turns may include at least one generative step, etc.). While in the reflective listening mode, when the policy manager selects a generative step, it determines a prompt indicative of the selected intent and provides the prompt, along a context of the conversation thread, to the LLM. In response to receipt of the prompt, the LLM generates a novel response that aims (e.g., is configured) to communicate that the non-human agent is listening to the member in a reflective style (e.g., by repeating back portions of the last message from the member, by using certain words, by using text or text strings having a certain semantic meaning, etc.). The policy model then provides this response to the member and selects one or more other steps, including a wait step to end the policy model turn. In response to receiving additional input from the member (e.g., receipt of another message posted by the member to the conversation thread), the policy model can perform another turn, which may include selecting one or more generative steps (e.g., wherein the same action prompt is used for multiple generative steps while in the conversation mode, wherein the action prompt may change between different generative steps while in the conversation mode, etc.).

Using the $2^{nd}$ set of models can optionally include mapping (e.g., by the $1^{st}$ set of models) the selected action/intent and/or the generative step to a prompt, wherein the prompt is utilized as an input (e.g., with the context and/or query, absent the selected intent, etc.) for the $2^{nd}$ set of models to evaluate. The prompt is preferably not surfaced to users, and further preferably is predetermined (e.g., through a prescribed 1:1 mapping between intent/action and the prompt). Alternatively, the $2^{nd}$ set of models can produce an output message absent a prompt, the prompt can be dynamically determined and/or variable (e.g., to take into account supplementary information such as member information and/or coach style), and/or the $2^{nd}$ set of models can be otherwise suitably evaluated.

In a particular example, upon selection of a choice associated with use of the $2^{nd}$ set of models (e.g., the coach or other user selecting a desired intent associated with a generative action, the policy model selecting a generative step, etc.), a prompt is retrieved (e.g., at the backend of the system) and provided, with a set of prior messages (e.g., context, context and query, etc.), to the LLM, which crafts a novel message based on these inputs.

The Action server can optionally additionally or alternatively function to handle responses associated with retrieval-type actions. For instance, the Action server can optionally include and/or reference (e.g., retrieve) a database or lookup table where response options can be retrieved (e.g., according to a predetermined mapping, according to the coach's preferred response, according to a selected action, etc.). In some examples, the Action server can modify the response (e.g., personalize the response, such as by replacing placeholder values and/or filling empty slots with one or more pieces of information specific to the member, which can include, in non-limiting examples, any or all of: names, gratitude lists, member goals, member mood, member quiz entries and/or results, etc.), such as modifying the response before providing it (e.g., providing to the care team user as a proposed response, providing it to the member by posting it to the conversation thread, etc.). The NLG server can then fill any necessary slots in the response with values in the context.

Additionally or alternatively, the system can include any other components and/or be configured in any other suitable ways.

4. Method

As shown by way of examples in FIGS. 2A-2C, a method 200 for intent-based action recommendations and/or fulfillment in a messaging platform can include any or all of: receiving a set of information associated with a request S100; producing and sending a set of intent options S200; receiving a selected intent S300; generating a message based on the selected intent and/or the set of information S400; and providing the message S500. Additionally or alternatively, the method 200 can include any or all of the processes described in U.S. application Ser. No. 18/189,526, filed 24 Mar. 2023, which is incorporated in its entirety by this reference, or any other suitable processes performed in any suitable order, or any other suitable processes performed in any suitable order. The method 200 can be performed with a system as described above and/or any other suitable system.

In preferred variants, the method 200 functions to enable mapping from intentions to prompts that enable an LLM (or other suitable model architecture) to generate responses that match the intention with limited input from the user. Without such an arrangement, a user (e.g., care team user) interfacing directly with an LLM might need to add a potentially lengthy prompt (e.g., much longer than the length of the message) that requires specific knowledge in order to achieve their goal, and/or a member might not be able to access care resources in the absence of a human care team user to converse with (e.g., if a member wants to engage in a conversation at a time when no appropriate member of their care team is available). This could be prohibitively costly and result in an inconsistent experience across care providers. In specific examples, the system and/or method are able to automatically label an intent for each provider message, which can optionally be used to continuously train and improve the functioning of a Dialog Manager, an Action server, and/or any other models.

Additionally or alternatively, the method 200 can perform any other suitable functions.

4.1 Method—Receiving a Set of Information Associated with a Request

The method 200 can include receiving a set of information associated with a request S100, which functions to provide a context that a generated message is ultimately and optimally configured to reflect. Additionally or alternatively, S100 can provide information which is used to trigger an instance of the method 200 or any of its processes, and/or S100 can perform any other functions.

In some variants (e.g., associated with a conversation thread between human users, such as between a member and a coach), S100 is preferably performed initially in the method 200. In some other variants (e.g., associated with a conversation thread between a member and a non-human agent), S100 is preferably performed after S200 and/or S300 (e.g., performed in the context of a conversation thread and/or conversation mode initiated in response to selection of an intent option in S300). However, S100 can additionally or alternatively be performed multiple times during the method 200 and/or at any other suitable time(s).

S100 is preferably performed each time a message is populated into a message thread (e.g., by any party in the thread, by any human party in the thread, only by the member, only by the coach, etc.), but can additionally or alternatively be performed at a predetermined frequency, in response to a trigger (e.g., request), when a message is received by the user's device, and/or at any other time(s).

The set of information preferably includes a set of messages provided within the messaging thread being analyzed, but can additionally or alternatively include messages from other threads (e.g., with the same member, with the same coach, with a different coach and/or member, etc.), a corpus of manually generated messages (e.g., from coaches), non-message inputs (e.g., coach preferences, member preferences, member information, images, audio recordings, etc.), and/or any other inputs or combination of inputs.

The messages can be any or all of: manually generated (e.g., by a coach, by a member, etc.), automatically generated (e.g., by the set of models, based on a previous performance of the method 200, etc.), or generated in other ways or in a combination of ways.

The messages can be from any party to the thread (e.g., any user in the thread), such as a coach, member, non-human agent (e.g., bot), and/or any other party or combination of parties.

The set of messages preferably includes a most recent message (equivalently referred to herein as a query) provided in the thread, wherein receipt of each message received in a thread (or receipt of any suitable subset of such messages) preferably functions to trigger an instance of the method 200, or to trigger any suitable subset thereof (e.g., for a conversation thread between a member and a non-human agent, triggering performance of S400 and/or S500, such as in cases in which an intent has already been selected and the conversation thread is being carried out in the context of the selected intent). Additionally or alternatively, any other messages can be received and/or used to trigger any or all of the method.

The set of messages further preferably includes a set of other messages in the thread (which are collectively equivalently referred to herein as a context and/or context messages), which function to provide a context for the last received message. The context messages preferably include a specific number of messages (e.g., 1, 2, 3, 4, 5, 6, 7, 8, 9, 10, between 1 and 5, between 5 and 10, greater than 10, etc.; a predetermined number of messages; a dynamically determined number of messages; etc.) in the thread received immediately prior to the query message, but can additionally or alternatively include any or all of: every other message previously received in the thread, messages from other threads (e.g., with the same member, with the same coach, etc.), all other messages in the thread, all other messages received within a predetermined time period (e.g., last minute, last 5 minutes, last hour, between the last 5 minutes and last 15 minutes, etc.), a specific amount of text (e.g., 20, 50, 100, 200, 300, 500, between 1 and 20, between 20 and 100, between 100 and 500, and/or greater than 500 words, etc.; a predetermined amount of text; a dynamically determined amount of text; etc.), all other messages received from a particular user (e.g., member, coach, etc.) in the thread, a random number of messages, and/or any other messages.

Additionally or alternatively, any other information-such as, but not limited to, supplementary information (e.g., member goals; coach goals; member and/or coach demographic information; member and/or coach preferences; results of member activities such as survey responses; session context, such as differentiating between a scheduled coaching session, and in-the-moment coaching support, or a clinical therapy session; etc.)—can be received in S100.

4.2 Method—Producing and Sending a Set of Intent Options

The method 200 can optionally include producing and sending a set of intent options S200, which can function to enable a user (e.g., providing user, such as a coach, clinician, and/or non-human provider; receiving user, such as a member or patient) to guide a conversation (e.g., between a providing user and a receiving user; between a non-human provider, such as a chat bot, and a receiving user; etc.), to select a mode or goal for a conversation, and/or otherwise affect and/or inform the responses determined by the set of models.

In some variants (e.g., associated with a conversation thread between human users, such as between a member and a coach), S200 can enable a providing user to guide how his or her conversation with a receiving user proceeds. For instance, by iteratively selecting intents throughout the conversation and/or when desired, a coach can still guide the conversation as desired (and how he or she would manually), while leveraging the efficiency of utilizing auto-generated messages that fulfill these intents. Additionally, the selection of an intent further preferably functions to decrease the time and/or effort spent by the providing user in sending messages back to a receiving user; decrease the time that a receiving user spends waiting for a message; and/or can perform any other functions.

In some other variants (e.g., associated with a conversation thread between a member and a non-human agent), S200 can enable a receiving user to initiate and/or guide one or more conversations (e.g., conversations with a non-human agent, such as with a chat bot). For instance, by selecting an intent, a member can initiate a conversation with a non-human agent (and/or set a conversation mode within such a conversation) according to their desires for the conversation.

In some variants (e.g., associated with a conversation thread between human users, such as between a member and a coach), S200 is preferably performed in response to (and/or during) S100, and further preferably in response to a trigger condition being satisfied (e.g., a new message being populated in a conversation thread, a new message from a receiving user being populated in a conversation thread, any new message being populated in a conversation thread, a threshold amount of time passing since a last message being received, etc.) (e.g., as described above).

In some other variants (e.g., associated with a conversation thread between a member and a non-human agent), S200 is preferably performed initially in the method 200, and can additionally or alternatively be performed in response to a trigger condition being satisfied (e.g., completion of a conversation).

However, S200 can additionally or alternatively be performed multiple times throughout the course of the method and/or at any other suitable time(s).

S200 is preferably performed with a $1^{st}$ set of models, such as a Dialog Manager, as described above, but can additionally or alternatively be performed with any other suitable tool(s). In specific examples, for instance, a $1^{st}$ API request from a Smart Actions API (in communication with the CareHub and the Dialog Manager) initiates the retrieval of a set of action/intent options to be sent to (e.g., displayed at an interface of) the providing user. The intents/actions preferably are each in the form of abbreviated, action-oriented text (e.g., "explain coaching", "practice reflective listening", etc.) that is easily consumed with limited cognitive load and/or minimal reading time by the providing user, but can alternatively have any other form(s).

Additionally or alternatively (e.g., in some variants associated with a conversation thread between a member and a non-human agent), S200 can be performed based on a predetermined set of action options, such as using a pre-defined menu or set of menus that present predetermined action options to the user.

However, S200 can additionally or alternatively include any other processes and/or be otherwise suitably performed.

4.3 Method—Receiving a Selected Intent Option

The method 200 can include receiving a selected intent option S300, which functions to indicate the conversation intent of the selecting user (e.g., coach, member, etc.). In some variants (e.g., associated with a conversation thread between human users, such as between a member and a coach), S300 can function to initiate generation of the message in S400 (e.g., wherein the intent option is selected by a coach). In some other variants (e.g., associated with a conversation thread between a member and a non-human agent), S300 can function to initiate a conversation or conversation mode with a non-human agent (e.g., wherein the intent option is selected by a member). Additionally or alternatively, S300 can perform any other suitable functions.

S300 is preferably performed in response to S200, but can additionally or alternatively be performed at any other suitable time(s).

Alternatively, S300 can include automatically determining and/or predicting an intent (e.g., based on the context of the message thread, based on previous conversations from the same providing user, based on receiving user information such as a set of goals, etc.).

In a first variant, a selected intent option is received at the Smart Actions API via a CareHub of the providing user. In a second variant, a selected intent option is received at a non-human agent API via a non-human agent interface of a member. Additionally or alternatively, a selected intent option can be received from any suitable source(s).

4.4 Method—Generating a Message Based on the Selected Intent and/or the Set of Information The method 200 can include generating a message based on the selected intent and/or the set of information S400. In some variants (e.g., associated with a conversation thread between human users, such as between a member and a coach), S400 functions to increase an efficiency with which a providing user can respond to a receiving user while maintaining a quality and context of a conversation, along with the providing user's desired intent. In some other variants (e.g., associated with a conversation thread between a member and a non-human agent), S400 functions to enable a member to guide a conversation with a non-human agent, thereby allowing the non-human agent to better meet the needs and/or goals of the member. Additionally or alternatively, S400 can perform any other function(s).

S400 is preferably performed with a $2^{nd}$ set of models, such as an Actionserver, as described above, where the $2^{nd}$ set of models includes an LLM configured to produce a message based on the selected intent and prior messages (e.g., a context, query, etc.) of the conversation or other conversations (e.g., related conversations, messages produced with the same intent, other conversations with the same providing user and/or receiving user, etc.). Alternatively, S400 can be otherwise suitably performed.

Additionally or alternatively, S400 can include initiating an action other than generating a message based on selecting an intent option, such as referencing a lookup table to retrieve a predetermined message; initiating a non-message action (e.g., adding notes to a notes section of the providing user's CareHub; initiating a member activity such as a check-in, quiz, or content module; etc.); and/or any other actions.

Additionally or alternatively, S400 can include any other suitable processes and/or be otherwise suitably performed.

4.5 Method—Providing the Message

The method 200 can include providing the message S500, which functions to populate the message in the conversation thread (e.g., thereby providing the message to a providing user and/or a recipient user). S500 is preferably performed in response to S400. In some variants (e.g., associated with a conversation thread between human users, such as between a member and a coach), S500 can be performed (e.g., following S400) based on acceptance (e.g., selection, approval, etc.) of the generated message (e.g., at his or her CareHub). Alternatively (e.g., in variants associated with a conversation thread between a member and a non-human agent, in variants associated with a conversation thread between human users, etc.), the generated message can be automatically populated in the conversation thread and/or otherwise suitably provided.

In preferred variants, a single generated message is provided (e.g., which can function to reduce the required work and/or time to review the message options). In alternative variants (e.g., associated with a conversation thread between human users, such as between a member and a coach), multiple message options can be provided. The message can optionally be editable by the providing user prior to sending.

The method 200 can additionally or alternatively include any other processes. In some variants, for instance, the method 200 can include training and/or retraining (e.g., updating, tuning, etc.) any or all of the models (e.g., $1^{st}$ set of models, $2^{nd}$ set of models, etc.). In some examples, for instance, the information on whether or not the providing user ultimately sends the generated message can be used to retrain one or both of the $1^{st}$ and $2^{nd}$ sets of models.

However, S500 can additionally or alternatively include providing the message in any other suitable manner and/or with any other suitable timing.

4.6 Method-Repetition of Elements

In some variants, the method 200 can optionally include repeating one or more of the elements described herein. For example, in some such variants (e.g., associated with a conversation thread between a member and a non-human agent), the method can include: performing S200 and S300 to determine an intent selection (e.g., thereby initiating a conversation mode), then repeatedly performing S100 (e.g., receiving a message from the member), S400 (e.g., determining a response message), and S500 (e.g., providing the response message to the member); further, the method can optionally include repeating this entire sequence (e.g., for different intent selections, different messages, different number of repetitions of S100, S400, and S500, etc.) any suitable number of times. However, the elements of the method can additionally or alternatively be repeated in any other suitable manner (or can be performed only once).

4.7 Method—Specific Examples

Figure 3A:
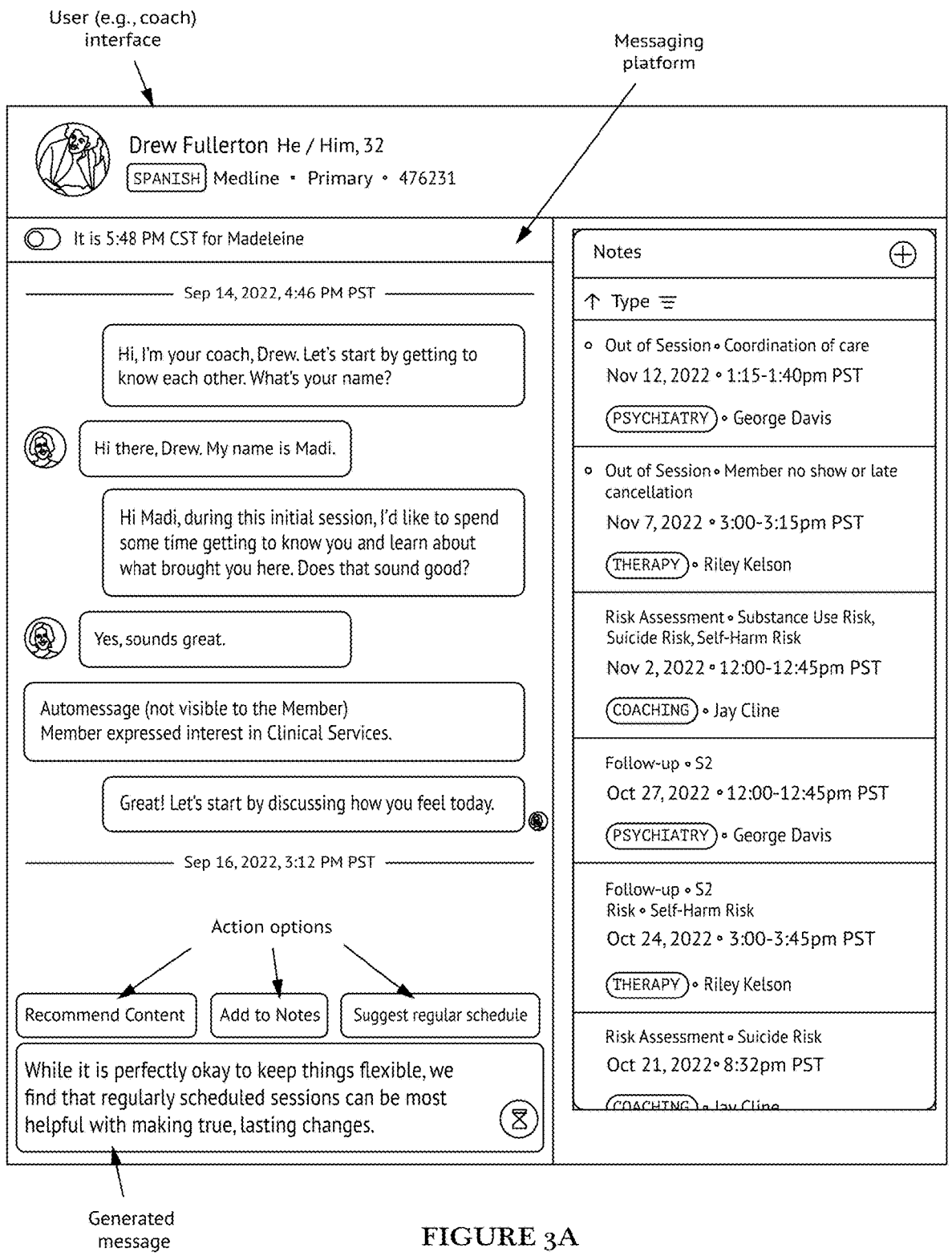

In a first specific example (e.g., as shown in FIG. 3A), a coach is engaged in a conversation thread with a member. The coach is presented with a plurality of action options (e.g., determined, such as by the first set of models, based on context such as the conversation thread transcript or a portion thereof, such as the most recent portion). The coach selects a particular action option (e.g., "Suggest regular schedule") from the presented options, and in response (e.g., based on the selected action and/or context such as the conversation thread transcript or a portion thereof, such as the most recent portion), a suggested message is generated (e.g., by the second set of models) or retrieved and provided to the coach. The coach can then choose to post the message to the conversation thread (e.g., as received, after modification/customization by the coach, etc.) or to discard the message. After another message is posted to the conversation thread, a new set of action options can be presented to the coach, and so on.

In a second specific example (e.g., as shown in FIGS. 4A-4B), a member initiates a session with a non-human agent. The member is first presented with a plurality of action options (e.g., as shown in FIG. 4A), such as a predetermined or dynamically-determined set of action options. The member selects a particular action option (e.g., "Start your reflection journey") from the presented options, and in response (e.g., based on the selected action), a conversation with the non-human agent is initiated (e.g., based on the selected action option, such as wherein the selected action option guides the actions of the non-human agent). For each turn of the conversation, the policy model selects response and/or system-level steps, posts messages to the conversation thread based on selected response steps (e.g., messages generated based on the selected action option, a prompt determined by the policy model, and/or contextual information such as the conversation transcript or a subset thereof), and selects a wait step to await a response from the user. The user is presented with the conversation thread, including a text entry field for providing responses, optionally along with one or more action options (e.g., predetermined or dynamically determined action options), such as shown in FIG. 4B. If the user posts a response to the conversation thread, the policy model begins another turn. If the user selects an action option, the policy model can enter a new conversation mode, the conversation can be paused or terminated, or any other suitable action can be taken.

However, the method can additionally or alternatively include any other suitable elements performed in any suitable manner and/or with any suitable timing.

Although omitted for conciseness, the preferred embodiments include every combination and permutation of the various system components and the various method processes, wherein the method processes can be performed in any suitable order, sequentially or concurrently.

Embodiments of the system and/or method can include every combination and permutation of the various system components and the various method processes, wherein one or more instances of the method and/or processes described herein can be performed asynchronously (e.g., sequentially), contemporaneously (e.g., concurrently, in parallel, etc.), or in any other suitable order by and/or using one or more instances of the systems, elements, and/or entities described herein. Components and/or processes of the following system and/or method can be used with, in addition to, in lieu of, or otherwise integrated with all or a portion of the systems and/or methods disclosed in the applications mentioned above, each of which are incorporated in their entirety by this reference.

Additional or alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

As a person skilled in the art will recognize from the previous detailed description and from the figures and claims, modifications and changes can be made to the preferred embodiments of the invention without departing from the scope of this invention defined in the following claims.

I claim:

1. A method comprising:
   receiving an action selection from a user;
   receiving a set of messages of a conversation thread, the set of messages comprising:
     at least one message posted to the conversation thread by the user; and
     a query message, wherein the query message was posted to the conversation thread by a second user;
   at a first set of trained models, based on the action selection, determining an action prompt for a large language model (LLM);
   at the LLM:
     receiving the action prompt and the set of messages; and
     in response to receiving the action prompt and the set of messages, generating a response message, the response message responsive to the query message and to the action prompt;
   providing the response message to the user;
   after providing the response message to the user, receiving an edited message from the user; and
   providing the edited message, and not the response message, to the second user.

2. The method of claim 1, wherein the action selection is received from the user after the query message is received.

3. The method of claim 1, further comprising, before receiving the action selection from the user:
   at the first set of trained models, determining a plurality of action selection options, the plurality of action selection options comprising the action selection; and
   providing the plurality of action selection options to the user.

4. The method of claim 3, wherein:
   the first set of trained models comprises a trained classifier model; and
   determining the plurality of action selection options comprises, at the classifier model, selecting at least one action selection option of the plurality based on the set of messages.

5. The method of claim 3, wherein determining the plurality of action selection options comprises determining at least one action selection option of the plurality based on the query message.

6. The method of claim 1, further comprising providing the response message to the second user within the conversation thread.

7. The method of claim 1, wherein the action prompt is determined based further on the conversation thread.

8. The method of claim 7, wherein determining the action prompt is performed at a generative model of the first set of trained models.

9. The method of claim 1, wherein the action prompt is determined based further on the query message.

10. The method of claim 9, further comprising, after providing the response message to the user:
    receiving a second query message from the user, the second query message different from the query message;
    at the first set of trained models, based on the second query message and the action selection, determining a second action prompt for the LLM, the second action prompt different from the action prompt;
    at the LLM:
      receiving the second action prompt and the second query message; and
      in response to receiving the second action prompt and the second query message, generating a second response message, the second response message responsive to the second query message and to the action prompt; and
    providing the second response message to the user.

11. The method of claim 10, further comprising, after providing the response message to the user:
    receiving a third query message from the user, the third query message different from the query message and different from the second query message;
    at the first set of trained models, based on the third query message and the action selection, determining a third response message responsive to the third query message and to the action prompt; and
    providing the third response message to the user.

12. The method of claim 11, wherein determining the third response message comprises: at a classifier model of the first set of trained models, based on at least the third query message, selecting a selected message from a corpus of predetermined messages, wherein the third response message is determined based on the selected message.

13. The method of claim 12, wherein the third response message is the selected message.

14. The method of claim 1, wherein the action selection is received from the user before the query message is received.

15. The method of claim 14, further comprising, in response to receiving the action selection from the user, initiating the conversation thread.

16. The method of claim 1, wherein the set of messages further comprises at least one message posted to the conversation thread by a non-human agent.

17. The method of claim 1, wherein the response message is provided to the user in near-real time in response to receiving the action selection and the set of messages.

18. The method of claim 1, wherein the query message poses a question.

19. The method of claim 1, wherein the at least one message posted to the conversation thread by the user comprises the query message.

\* \* \* \* \*